United States Patent
Cai et al.

(10) Patent No.: US 9,958,894 B2
(45) Date of Patent: May 1, 2018

(54) LATENCY-BASED MICRO DEMAND RESPONSE WITH BIDIRECTIONAL CURTAILMENT MARGINS

(71) Applicant: FUJITSU LIMITED, Kawasaki-shi, Kanagawa (JP)

(72) Inventors: Wuhan Desmond Cai, Pasadena, CA (US); Jorjeta Jetcheva, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 533 days.

(21) Appl. No.: 14/594,015

(22) Filed: Jan. 9, 2015

(65) Prior Publication Data

US 2016/0187909 A1 Jun. 30, 2016

Related U.S. Application Data

(60) Provisional application No. 62/098,210, filed on Dec. 30, 2014.

(51) Int. Cl.
  *G05B 15/02* (2006.01)
  *G05F 1/66* (2006.01)
  *G06F 1/26* (2006.01)

(52) U.S. Cl.
  CPC .................. *G05F 1/66* (2013.01); *G06F 1/26* (2013.01); *Y02B 70/3225* (2013.01);
  (Continued)

(58) Field of Classification Search
  CPC ......... G05F 1/66; G06F 1/26; Y02B 70/3225; Y02B 70/3266; Y04S 20/222; Y04S 20/242
  See application file for complete search history.

(56) References Cited

U.S. PATENT DOCUMENTS

| | | | |
|---|---|---|---|
| 9,002,761 B2 * | 4/2015 | Montalvo | G06Q 10/06 322/38 |
| 2011/0172846 A1 * | 7/2011 | Kulyk | G06Q 10/04 700/296 |

(Continued)

OTHER PUBLICATIONS

Mathieu, Johanna, et al. "State estimation and control of electric loads to manage real-time energy imbalance." Power Systems, IEEE Transactions on , vol. 28, No. 1, pp. 430-440, Feb. 2013.

Meyn, Sean, et al. "Ancillary service to the grid from deferrable loads: the case for intelligent pool pumps in Florida." Decision and Control (CDC), 2013 IEEE 52nd Annual Conference on , vol., No., pp. 6946-6953, Dec. 10-13, 2013.

(Continued)

*Primary Examiner* — Abdelmoniem Elamin
(74) *Attorney, Agent, or Firm* — Maschoff Brennan

(57) ABSTRACT

A method includes separating a collection of devices configured for participation in a demand response (DR) event into an On-to-Off DR device set (On-to-Off set) and an Off-to-On DR device set (Off-to-On set). The method includes forming latency groups from devices of the Off-to-On set and the On-to-Off set based on a lower curtailment margin and an upper curtailment margin defined for a macro DR event. The method includes portioning one or more transition groups from the devices of the Off-to-On set and the On-to-Off set. The portioning is based on device curtailment capacities of the devices of the Off-to-On set and the On-to-Off set, a dynamic lower curtailment margin, and a dynamic upper curtailment margin. The method includes creating transition group pairs from the transition groups and executing a micro DR event such that an energy curtailment remains within the curtailment band.

20 Claims, 12 Drawing Sheets

(52) U.S. Cl.
CPC .......... *Y02B 70/3266* (2013.01); *Y04S 20/222* (2013.01); *Y04S 20/242* (2013.01)

(56) References Cited

U.S. PATENT DOCUMENTS

| | | | | |
|---|---|---|---|---|
| 2014/0148953 | A1* | 5/2014 | Nwankpa | G06Q 10/0631 700/276 |
| 2015/0244172 | A1* | 8/2015 | Trudel | H02J 3/12 307/129 |
| 2015/0324604 | A1* | 11/2015 | Roy | H04L 9/003 713/164 |
| 2015/0324817 | A1* | 11/2015 | Chen | G06Q 30/0202 705/7.31 |
| 2015/0345812 | A1* | 12/2015 | Murthy | F24F 11/001 700/276 |
| 2015/0346741 | A1* | 12/2015 | Murthy | G05B 15/02 700/276 |
| 2016/0091904 | A1* | 3/2016 | Horesh | F24F 11/0034 1/34 |
| 2016/0187907 | A1* | 6/2016 | Jetcheva | G05B 15/02 700/297 |

OTHER PUBLICATIONS

Hao, He, et al. "A generalized battery model of a collection of thermostatically controlled loads for providing ancillary service." Annual Allerton Conference, Oct. 2013.

Alizadeh, Mahnoosh, et al. "Least laxity first scheduling of thermostatically controlled loads for regulation services." GlobalSIP Conference, Dec. 2013.

Pruckner, Marco, et al. "A Study on the impact of packet loss and latency on real-time demand response in smart grid." Globecom Workshops Dec. 2012.

Guo, Feng, et al. "Comprehensive real-time simulation of the smart grid." Industry Applications, IEEE Transactions on , vol. 49, No. 2, pp. 899-908, Mar. 2013.

Pourmousavi, S. Ali, et al. "Real-time central demand response for primary frequency regulation in microgrids." Smart Grid, IEEE Transactions on , vol. 3, No. 4, pp. 1988-1996, Dec. 2012.

Ulrich Herberg et al., "OpenADR 2.0 Profile Specification B Profile" OpenADR 2.0b Profile Specification, Jul. 1, 2013.

OpenADR 2.0 Profile Specification a Profile, OpenADR 2.0a Profile Specification, 2011.

* cited by examiner

200A

| | 202A | | 202B | | | | 202C | | | 202D |
|---|---|---|---|---|---|---|---|---|---|---|
| LATENCY | 55 | 53 | 49 | 46 | 45 | 40 | 39 | 26 | 21 | 10 |
| CURTAILMENT CAPACITY | 6 | 6 | 10 | 4 | 2 | 4 | 3 | 4 | 13 | 1 |
| DEVICE ID | D3 | D2 | D1 | D4 | D9 | D6 | D8 | D7 | D5 | D10 |
| S | 12 | | 20 | | | | 20 | | | 1 |
| Z | 53 | | 40 | | | | 31 | | | 10 |
| L_THRESHOLD | 29.49 | | 0.83 | | | | -8.16 | | | -18.58 |
| LAVG | 39.16 | | | | | | | | | |
| C_UPPER | 20 | | | | | | | | | |

200B

| | 203A | | | | | | | 203B | | |
|---|---|---|---|---|---|---|---|---|---|---|
| LATENCY | 55 | 53 | 49 | 46 | 45 | 40 | 39 | 26 | 21 | 10 |
| CURTAILMENT CAPACITY | 6 | 6 | 10 | 4 | 2 | 4 | 3 | 4 | 13 | 1 |
| DEVICE ID | D3 | D2 | D1 | D4 | D9 | D6 | D8 | D7 | D5 | D10 |

200C

| | 203A | | | | | | | 203B | | |
|---|---|---|---|---|---|---|---|---|---|---|
| LATENCY | 49 | 53 | 55 | 46 | 40 | 39 | 45 | 26 | 21 | 10 |
| CURTAILMENT CAPACITY | 10 | 6 | 6 | 4 | 4 | 3 | 2 | 13 | 4 | 1 |
| DEVICE ID | D1 | D2 | D3 | D4 | D6 | D8 | D9 | D5 | D7 | D10 |

| | 202E | | 202F | | 202G | | | 202H | | 202I |
|---|---|---|---|---|---|---|---|---|---|---|
| LATENCY | 60 | 55 | 53 | 49 | 44 | 40 | 35 | 25 | 18 | 12 |
| CURTAILMENT CAPACITY | 11 | 3 | 8 | 8 | 6 | 4 | 1 | 7 | 2 | 10 |
| DEVICE ID | E5 | E3 | E9 | E1 | E7 | E6 | E10 | E8 | E4 | E2 |
| S | 18 | | 16 | | 11 | | | 9 | | 10 |
| Z | 55 | | 49 | | 35 | | | 18 | | 12 |
| L_THRESHOLD | 14.48 | | 12.98 | | 10.28 | | | -2.25 | | -10.50 |
| LAVG | 40.51 | | | | | | | | | |
| C_LOWER | 18 | | | | | | | | | |

200E

| | 203C | | | | | | | | | 203D |
|---|---|---|---|---|---|---|---|---|---|---|
| LATENCY | 60 | 55 | 53 | 49 | 44 | 40 | 35 | 25 | 18 | 12 |
| CURTAILMENT CAPACITY | 11 | 3 | 8 | 8 | 6 | 4 | 1 | 7 | 2 | 10 |
| DEVICE ID | E5 | E3 | E9 | E1 | E7 | E6 | E10 | E8 | E4 | E2 |

200F

| | 203C | | | | | | | | | 203D |
|---|---|---|---|---|---|---|---|---|---|---|
| LATENCY | 60 | 53 | 49 | 25 | 44 | 40 | 55 | 18 | 35 | 12 |
| CURTAILMENT CAPACITY | 11 | 8 | 8 | 7 | 6 | 4 | 3 | 2 | 1 | 10 |
| DEVICE ID | E5 | E9 | E1 | E8 | E7 | E6 | E3 | E4 | E10 | E2 |

| | 210A | | 210B | 210A | 210B | | | 210C | | 210B |
|---|---|---|---|---|---|---|---|---|---|---|
| LATENCY | 49 | 53 | 55 | 46 | 40 | 39 | 45 | 26 | 21 | 10 |
| CURTAILMENT CAPACITY | 10 | 6 | 6 | 4 | 4 | 3 | 2 | 13 | 4 | 1 |
| DEVICE ID | D1 | D2 | D3 | D4 | D6 | D8 | D9 | D5 | D7 | D10 |

200H →

| | 212A | | 212B | 212A | 212C | 212B | | 212C | | 212D |
|---|---|---|---|---|---|---|---|---|---|---|
| LATENCY | 60 | 53 | 49 | 25 | 44 | 40 | 55 | 18 | 35 | 12 |
| CURTAILMENT CAPACITY | 11 | 8 | 8 | 7 | 6 | 4 | 3 | 2 | 1 | 10 |
| DEVICE ID | E5 | E9 | E1 | E8 | E7 | E6 | E3 | E4 | E10 | E2 |

200I →

| C_UPPER | 20 | C_LOWER | 18 | | |
|---|---|---|---|---|---|
| C_DYN_UPPER_1 | 18 | C_DYN_LOWER_1 | 20 | C1 | 2 |
| C_DYN_UPPER_2 | 22 | C_DYN_LOWER_2 | 16 | C2 | -4 |
| C_DYN_UPPER_3 | 27 | C_DYN_LOWER_3 | 11 | C3 | -5 |

| | 210A | | | 210B | | | | 210C | |
|---|---|---|---|---|---|---|---|---|---|
| LATENCY | 49 | 53 | 46 | 55 | 40 | 39 | 45 | 10 | 21 | 26 |
| CURTAILMENT CAPACITY | 10 | 6 | 4 | 6 | 4 | 3 | 2 | 1 | 4 | 13 |
| DEVICE ID | D1 | D2 | D4 | D3 | D6 | D8 | D9 | D10 | D7 | D5 |

200K

| | 212A | | 212B | | | 212C | | | 212D |
|---|---|---|---|---|---|---|---|---|---|
| LATENCY | 60 | 25 | 53 | 49 | 40 | 44 | 55 | 18 | 35 | 12 |
| CURTAILMENT CAPACITY | 11 | 7 | 8 | 8 | 4 | 6 | 3 | 2 | 1 | 10 |
| DEVICE ID | E5 | E8 | E9 | E1 | E6 | E7 | E3 | E4 | E10 | E2 |

FIG. 2D

LATENCY-BASED MICRO DEMAND RESPONSE WITH BIDIRECTIONAL CURTAILMENT MARGINS

CROSS-REFERENCE TO RELATED APPLICATION

This patent application claims the benefit of U.S. Patent Application No. 62/098,210, filed Dec. 30, 2014, which is incorporated herein by reference.

FIELD

The embodiments discussed herein are related to latency-based micro demand response with bidirectional curtailment margins.

BACKGROUND

Utilities incentivize curtailment of energy usage during certain high load periods to increase the ability of the utilities to meet a larger demand or to reduce production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of executing a macro demand response (DR) event includes separating a collection of devices configured for participation in the macro DR event into an On-to-Off DR device set (On-to-Off set) and an Off-to-On DR device set (Off-to-On set). The method may include forming one or more latency groups from devices of the Off-to-On set based on a lower curtailment margin that is defined for the macro DR event. The method may include forming one or more latency groups from devices of the On-to-Off set based on an upper curtailment margin that is defined for the macro DR event. The method may include portioning one or more transition groups from the devices of the Off-to-On set, which may be based on device curtailment capacities of the devices of the Off-to-On set and a dynamic lower curtailment margin. The dynamic lower curtailment margin may include a modification of the lower curtailment margin that takes into account a difference of the device curtailment capacities of the devices in previously formed transition groups. The method may include portioning one or more transition groups from the devices of the On-to-Off set, which may be based on the device curtailment capacities of the devices of the On-to-Off set and a dynamic upper curtailment margin. The dynamic upper curtailment margin may include a modification of the upper curtailment margin that takes into account a difference of the device curtailment capacities of the devices in previously formed transition groups.

The method may include creating transition group pairs from the transition groups. One or more of the transition group pairs includes one of the transition groups formed from the devices of the On-to-Off set and one of the transition groups formed from the devices of the Off-to-On set. During a DR event duration, the method may include executing a micro DR event. The micro DR event includes state transitions in which the devices in the transition group pairs transition from a current state to an alternative state such that an energy curtailment during the state transitions remains within the curtailment band. The curtailment band is defined between the upper curtailment margin and the lower curtailment margin.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2A illustrates a portion of an example technique for execution of a micro DR event that may be implemented in the DR system of FIG. 1;

FIG. 2B illustrates a portion of an example technique for execution of the micro DR event that may be implemented in the DR system of FIG. 1;

FIG. 2C illustrates a portion of an example technique for execution of the micro DR event that may be implemented in the DR system of FIG. 1;

FIG. 2D illustrates a portion of an example technique for execution of the micro DR event that may be implemented in the DR system of FIG. 1;

DESCRIPTION OF EMBODIMENTS

Demand response (DR) events generally include periods in which a utility and/or a DR aggregator curtail or incentivize curtailment of energy usage. For instance, DR events may be implemented when energy prices provide a motive to curtail energy. In some circumstances such as DR systems implementing direct load control (DLC) programs, instead of executing a single DR event, multiple micro DR events may be executed to achieve a similar energy curtailment. The micro DR events may include state transitions (e.g., On-to-Off or Off-to-On) of one or more devices to which energy is supplied.

Execution of the micro DR events may include a sequence of state transitions of subsets of devices referred to herein as transition groups. Provisioning (e.g., a determination of which devices to include and which devices to not include) the transition groups may be based at least partially on the latencies of the devices, curtailment capacity of the devices (hereinafter, "device curtailment capacity" or "curtailment capacity"), and a curtailment band, which may be defined for a DR event. The latencies include a time or delay between signaling a device to transition state and the device transitioning or between signaling a device to transition state and confirming a transition of state. The curtailment capacity includes an amount of energy curtailed while a device is in a non-operational (e.g., an Off state) or a reduced operational state.

The curtailment band includes a range of energy curtailment defined between a lower curtailment margin and an upper curtailment margin. A convention used herein is that the lower curtailment margin applies to devices that are transitioning from Off-to-On and the upper curtailment margin applies to devices that are transitioning from On-to-Off. Thus, the lower curtailment margin includes a minimum amount of energy curtailed and the upper curtailment margin includes a maximum amount of energy curtailed.

While it is generally preferable to curtail too much energy during a DR event, incentives may only be offered for curtailment to a particular level. For example, all devices may be transitioned to an Off state; however, the utility may only offer an incentive for 50% of the energy curtailed by such an action. Thus, there is little incentive to curtail more than the upper curtailment margin. Accordingly, in the embodiments discussed herein, the transition groups may be provisioned to ensure that enough energy is curtailed during the DR event. Additionally, transition groups may be provisioned to limit or minimize curtailment of energy for which no incentive is received.

This and other embodiments are described herein with reference to the appended drawings.

Figure 1:
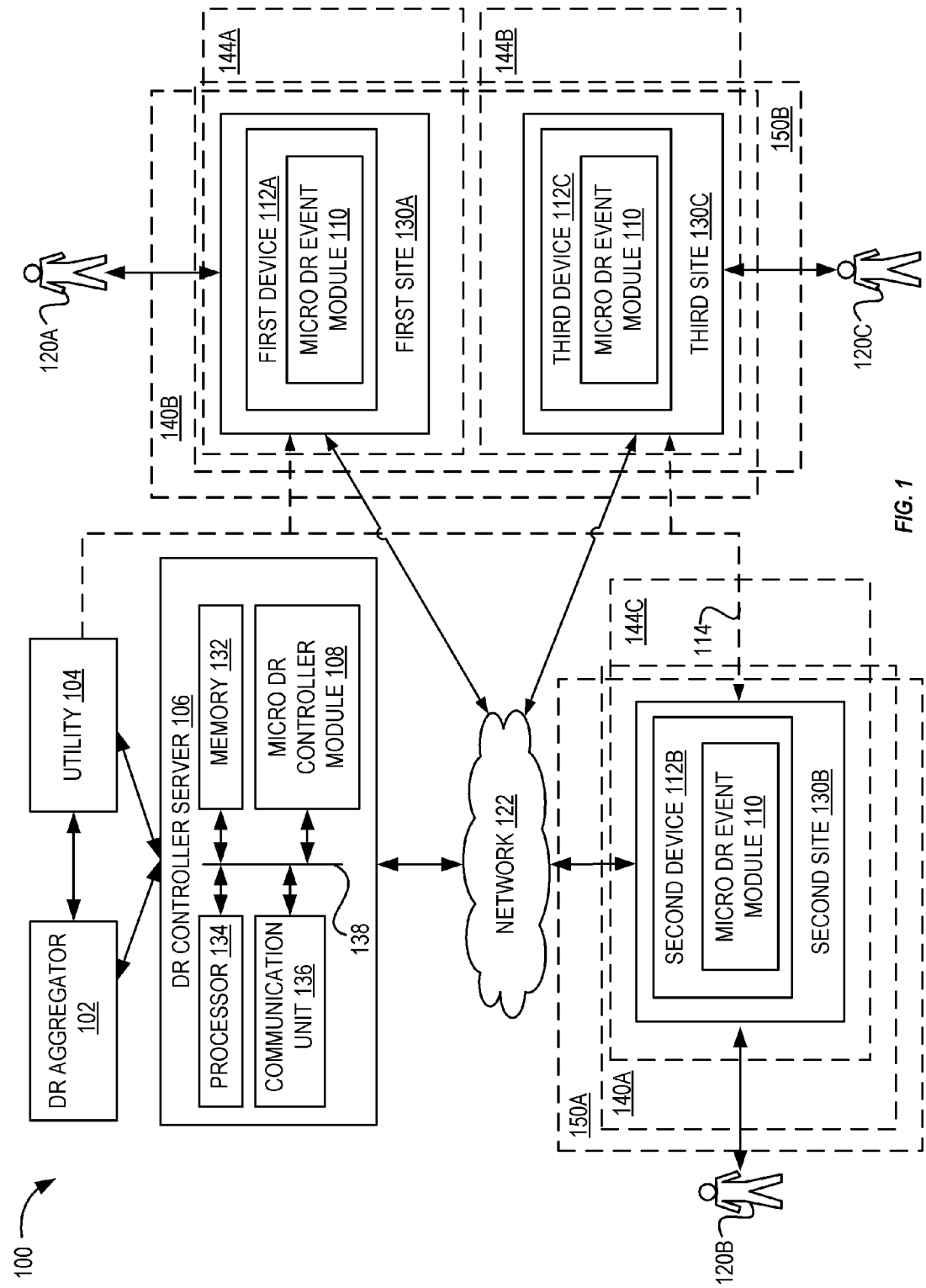
FIG. 1 is a block diagram of an example demand response (DR) system.

FIG. 1 is a block diagram of an example DR system 100, arranged in accordance with at least one embodiment described herein. In the DR system 100, a utility 104 and/or a DR aggregator 102 may implement or control implementation of a DR event through execution of one or more micro DR events. The DR event is distinguished herein from the micro DR event in that the DR event includes a series and/or sequence of micro DR events. In this application, the DR event is sometimes referred to as a macro DR event. Again, the macro DR event may include a series and/or sequence of micro DR events. Some additional details of relationships between the micro DR events and the (macro) DR events are provided elsewhere herein.

The micro DR events may involve one or more devices 112A-112C (generally, device 112 or devices 112) located at one or more sites 130A-130C (generally, site 130 or sites 130). When described together, the devices 112 may be referred to as a collection of the devices 112. In some embodiments, the collection of the devices 112 may be a subset of devices and/or sites (e.g., 112 and/or 130) to which the utility 104 supplies energy and/or is managed by the DR aggregator 102. The devices 112 included in the collection of the devices 112 may be configured for participation in DR events while one or more other devices and/or sites that are not included in the collection of the devices 112 may not be configured for participation in DR events.

Generally, a DR event may include a DR duration during which energy usage is curtailed. An example of the DR duration may include a time period on a particular date or across multiple dates, such as from 3:00 PM on Jan. 1, 2014 until 5:00 PM on Jan. 1, 2014. Additionally, the DR event may include a total curtailment, which may include a total curtailment during the DR event. An example of a total curtailment may include one megawatt-hour (MWh). The total curtailment may include a sum of curtailments by participating sites (e.g., the sites 130) and/or participating devices (e.g., 112). Accordingly, an example DR event may include a DR duration from 3:00 PM on Jan. 1, 2014 until 5:00 PM on Jan. 1, 2014. During the DR duration, the utility 104 and/or the DR aggregator 102 may coordinate the curtailment of one MWh in aggregate energy curtailment by the devices 112 and/or the sites 130.

In the DR system 100, rather than issuing one DR event with a DR duration and a total curtailment in which operation of the devices 112 is affected (e.g., ceased or reduced), the utility 104 and/or the DR aggregator 102 may issue two or more micro DR events. Each of the micro DR events may include a micro DR duration. For instance, if the DR duration is about four hours, the DR duration may be separated into eight micro DR durations of about 30 minutes each. A sum of the micro DR durations may substantially equal the DR duration, may be greater than the DR duration, or may be less than the DR duration.

During the micro DR duration, operation of a first set of the devices 112 is ceased or reduced, and operation of a second set of the devices 112 is not affected. During a subsequent micro DR event, the operation of the second set of the devices 112 may be ceased or reduced, and the operation of the first set of the devices 112 may be returned to an operational or fully operational state. During a subsequent micro DR event, the operation of the first set of the devices 112 may be ceased or reduced, and the operation of the second set of the devices 112 may be returned to an operational or fully operational state. A similar pattern of operations may be performed for one or more subsequent micro DR events.

In some embodiments, one or more devices 112 included in one or both of the first set and the second set of the devices 112 may be changed between subsequent micro DR events and/or between micro DR events in a series of micro DR events. In other embodiments, the devices 112 included in the first and the second sets of the devices 112 may be consistent throughout the series of micro DR events. Additionally, over time (e.g., between DR events or conditions in which DR events may be issued) the devices 112 included in the collection of the devices 112 and/or in one or both of the sets may be changed.

Ceasing or reducing operation of the devices 112 may curtail a particular curtailment amount. A sum of the particular curtailment amounts of the series of micro DR events may be substantially equal to the total curtailment. Thus, the utility 104 and/or the DR aggregator 102 may achieve the total curtailment by issuing the micro DR events.

A benefit of the micro DR events may include a reduction in interruption of the operation of the devices 112. For example, by periodically (e.g., during every other micro DR duration) interrupting operation, the overall function of one or more of the devices 112 may not be affected. Similarly, one or more of the devices 112 may be included in a subset of a series of micro DR events without necessarily being included in another of the series of micro DR events. Thus, the utility 104 and/or the DR aggregator 102 may achieve a total curtailment by distributing curtailment among a large number of the devices 112, which may reduce perception of the curtailment by customers (e.g., 120).

In the DR system 100 of FIG. 1, a DR controller server (DR server) 106 may communicate with the devices 112 via a network 122 to execute the micro DR events. The utility 104 and/or the DR aggregator 102 may be associated with the DR server 106. The sites 130 and/or the devices 112 may be associated with customers 120A-120C (generally, customer 120 or customers 120). The term "associated with," when used herein may refer to a relationship between the DR aggregator 102 and/or the utility 104 and the DR server 106 or between the customers 120 and the sites 130 and the devices 112, and/or may indicate ownership and/or control, directly or indirectly. For example, information communicated from the DR server 106 may be controlled by the utility 104 and/or the DR aggregator 102, and information communicated to the DR server 106 may be intended for the utility 104 and/or the DR aggregator 102. Each of these entities and systems are briefly introduced in the following paragraphs.

The network 122 may include a wired or wireless network, and may have any suitable configuration, such as a star configuration, a token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In the DR system 100, the utility 104 may distribute energy, which may include electricity, to the sites 130 and the devices 112. The distribution of the energy by the utility 104 to the sites 130 and the devices 112 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set terms for the micro DR events. For example, the utility 104 may set an incentive, a micro DR duration, a total curtailment, a curtailment margin (discussed elsewhere herein), and the like.

The sites 130 may include buildings, structures, equipment, or other objects that use energy distributed by the utility 104. The sites 130 may include multiple types of structures ranging from private residences to large industrial factories or office buildings. In some embodiments, the sites 130 included in the DR system 100 may include residences and/or small- and medium-size business (SMB) sites.

The sites 130 may include the devices 112. The devices 112 may include any device that consumes energy distributed by the utility 104 to the sites 130. Additionally or alternatively, the devices 112 may control operation of a device that consumes energy distributed by the utility 104.

For instance, the utility 104 may distribute energy to a first site 130A. A first device 112A may then consume the energy distributed to the first site 130A. Additionally or alternatively, the first device 112A may control consumption of the energy distributed by the utility 104 by another device. The first device 112A may affect operation of the other device such that the other device consumes (or does not consume) the energy distributed to the first site 130A. The devices 112 may include memory (e.g., a memory 132 described herein), a processor (e.g., a processor 134 described herein), and network communication capabilities (e.g., a communication unit 136 described herein).

The devices 112 may include a micro DR event module 110. The micro DR event module 110 may include code and routines configured for implementation of micro DR events as described herein. In some embodiments, the micro DR event module 110 may be implemented using hardware including, for example, a field-programmable gate array (FPGA) or an application-specific integrated circuit (ASIC). In some other instances, the micro DR event module 110 may be implemented using a combination of hardware and software.

The micro DR event module 110 may be configured to receive and implement communications received via the network 122 and/or communicate signals related to the devices 112 via the network 122. For example, a signal communicated from the DR server 106 to transfer state may be implemented at the device 112 by the micro DR event module 110. Additionally or alternatively, the micro DR event module 110 may communicate a confirmation signal to the DR server 106 following a change of state.

In some embodiments, the micro DR event module 110 may include routines configured to respond to signals sent in a DLC program. In a DLC program, the DR server 106 may directly control state transitions of the device 112. In other embodiments, the micro DR event module 110 may be configured to implement other types of DR programs. Some examples of the devices 112 may include a water heater, an air-conditioner (A/C), a heater, a piece of commercial or industrial equipment, a thermostat, a smart appliance, a controller for a piece of equipment, a pool heater, a household appliance, a refrigerator, a fan, a freezer, a ventilation unit, a thermostatically controlled unit, an appliance charging device, an electric vehicle charging device, a pool pump, and the like.

The customers 120 may include individuals, groups of individuals, or other entities. The sites 130 and the devices 112 may be associated with the customers 120. For example, a first customer 120A may be associated with the first site 130A and the first device 112A and a second customer 120B may be associated with a second site 130B and a second device 112B, etc. In some embodiments, the customers 120 may determine whether to participate in micro DR events and/or under what conditions a micro DR event may include a particular device 112. In other embodiments, the customers 120 may agree in advance to participate in or allow curtailment of the devices 112 in the micro DR events.

The DR aggregator 102 may include an entity that acts as an intermediary between the utility 104 and the sites 130 and/or the customers 120. An example of the role as the intermediary may include coordination and implementation of the micro DR events. For example, the DR aggregator 102 may coordinate the customers 120 such that total curtailment amounts may be achieved during one or more micro DR events. In addition, the DR aggregator 102 may identify the sites 130 and/or the customers 120 to include in the DR system 100. In some embodiments, criteria of the micro DR events and/or an incentive offered by the utility 104 may be communicated to the DR aggregator 102. The DR aggregator 102 may in turn communicate the criteria to the customers 120 and/or the sites 130 and offer some portion of the incentive to the sites 130 in exchange for participation in the micro DR events.

The sites 130 may be managed by the DR aggregator 102. The DR aggregator 102 may coordinate implementation of, or implement via the DR server 106, the micro DR events by the devices 112 it manages. In the depicted embodiment, the DR aggregator 102 may act as an intermediary as described above. In some embodiments, the DR aggregator 102 may be omitted and the utility 104 may directly implement the micro DR events via the DR server 106.

The DR server 106 may include a hardware server that includes the processor 134, the memory 132, the communication unit 136, and a micro DR controller module (controller module) 108. The processor 134, the memory 132, the communication unit 136, and the controller module 108 may be communicatively coupled by a bus 138.

The processor 134 may include an arithmetic logic unit (ALU), a microprocessor, a general-purpose controller, or some other processor or processor array to perform one or more operations described herein. The processor 134 may be coupled to the bus 138 for communication with the other components (e.g., 108, 132, and 136). The processor 134 generally processes data signals. The processor 134 may include various computing architectures including a complex instruction set computer (CISC) architecture, a reduced instruction set computer (RISC) architecture, or an architecture implementing a combination of instruction sets. Although the DR server 106 of FIG. 1 includes a single processor 134, multiple processors may be included in the DR server 106 in which the multiple processors may be configured to collectively or individually perform the operations of the DR server 106.

The memory 132 may be configured to store instructions and/or data that may be executed by the processor 134. The memory 132 may be coupled to the bus 138 for communication with the other components. The instructions and/or data may include code for performing the techniques or methods described herein. The memory 132 may include Dynamic Random Access Memory (DRAM), Static RAM (SRAM), flash memory, or any other applicable type of memory. In some embodiments, the memory 132 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 136 may be configured to transmit data to and receive data from the devices 112. The communication unit 136 may be coupled to the bus 138. In some embodiments, the communication unit 136 may include a port for direct physical connection to the network 122 or to another communication channel. For example, the communication unit 136 may include a universal serial bus (USB), standard definition (SD), CAT-5, or similar port for wired communication with the devices 112. In some embodiments, the communication unit 136 includes a wireless transceiver for exchanging data via communication channels using one or more wireless communication methods, including IEEE 802.11, IEEE 802.16, BLUETOOTH®, or another suitable wireless communication method.

In some embodiments, the communication unit 136 includes a cellular communications transceiver for sending and receiving data over a cellular communications network including via SMS, MMS, HTTP, direct data connection, WAP, e-mail, or another suitable type of electronic communication. In some embodiments, the communication unit 136 includes a wired port and a wireless transceiver. The communication unit 136 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the DR system 100, the controller module 108 of the DR server 106 may be configured to execute one or more micro DR events. Execution of the micro DR events may include signaling the first set of the devices 112 to perform a first state transition (e.g., On-to-Off) and signaling the second set of the devices 112 to perform a second state transition (e.g., Off-to-On). More generally, signaling by the DR server 106 may cause state transitions of one or more of the devices 112 from a current state to an alternative state. For example, the first device 112A may be in an On state (e.g., operating), which may be a current state of the first device 112A. The second device 112B may be in an Off state (e.g., not operating), which may be a current state of the second device 112B. A state transition of the first device 112A may transition the first device 112A to an Off state (e.g., not operating) such that the first device 112A performs an On-to-Off transition. Similarly, a state transition of the second device 112B may transition the second device 112B to an On state (e.g., operating) such that the second device 112B performs an Off-to-On transition.

In general, curtailing too much energy during the micro DR events is favored over not curtailing enough energy. However, the utility 104 may only offer incentives for energy curtailment to a particular level. Accordingly, the DR server 106 may determine state transitions of the devices 112 of a micro DR event such that at least a particular amount of energy is consistently curtailed during each of the micro DR events and during transitions from one micro DR event to the next micro DR event. The particular amount of energy may be represented by the lower curtailment margin.

Additionally, the DR server 106 may determine the state transitions of the devices 112 during a micro DR event such that no more than a second particular amount of energy is curtailed during each of the micro DR events and during transitions from one micro DR event to the next micro DR event. The second particular amount of energy may be represented by the upper curtailment margin. Thus, the DR server 106 determines the state transitions such that energy curtailment during micro DR events is within a curtailment band, which may be defined between the upper curtailment margin and the lower curtailment margin.

The upper and lower curtailment margins may include a percentage or a portion of a total curtailment of a DR event or a micro DR event. For example, a DR event may include a DR duration of ten hours and a total energy curtailment of ten MWh. The utility 104 may offer an incentive for the curtailment of ten MWh. Accordingly, for each hour of the DR duration, about one MWh may be curtailed. The DR event may be separated into ten micro DR events, each having a curtailment margin of one MWh. The lower curtailment margin may be 1.05 MWh and the upper curtailment margin may be 1.15 MWh. Thus, during the ten micro DR events, the total curtailment of ten MWh may be achieved, for which an incentive is received. Additionally, the ten MWh curtailment may be received without curtailing significantly more energy than required to receive the incentive.

The upper and lower curtailment margins may be used to determine which devices 112 or combinations thereof are included in one or more micro DR events. Additionally, the upper and lower curtailment margins may be used to determine a sequence in which the devices 112 or combinations thereof transition state.

In some embodiments, transition of one or more of the devices 112 and/or inclusion of one or more of the devices 112 into a group that transitions together (e.g., transition groups 144 discussed elsewhere herein) may be based on a relationship between the upper and/or lower curtailment margin (e.g., a value of the curtailment margin) and a curtailment capacity of the one or more devices 112.

Additionally, in some embodiments, a dynamic upper curtailment margin and a dynamic lower curtailment margin may be based on the upper curtailment margin and the lower curtailment margin, respectively. The dynamic lower curtailment margin may include the lower curtailment margin modified to take into account a difference of the device curtailment capacities of the devices 112 in previously formed transition groups. The dynamic upper curtailment margin may include the upper curtailment margin modified to take into account a difference of the device curtailment capacities of the devices in previously formed transition groups.

In the DR system 100 of FIG. 1, the DR server 106 may take into consideration latency of the devices 112. The latency of the devices 112 may include communication latency such as heterogeneous communication latencies, which may be inherent in deployments across WANs. The communication latency for each of the devices 112 may include a delay in signal communication between the DR server 106 and a corresponding one of the devices 112. For example, the DR server 106 may communicate a signal to the first device 112A via the network 122 and/or the first device 112A may communicate a confirmation signal to the DR server 106 via the network 122. The signal and/or the confirmation signal may be delayed due to network devices included in the network 122, network media, distances between the DR server 106 and the first device 112A, or some combination thereof.

Additionally or alternatively, the latency may include device latency. The device latency may include a time that it takes for the state of the device 112 to transition to another state following reception of a signal to transition. For example, the DR server 106 may communicate the signal to the first device 112A via the network 122. The signal may be received at the first device 112A. Following reception of the signal, the first device 112A may take some time to transition from an On state to an Off state or vice versa.

The DR server 106 may be configured to consider the latency of the devices 112 when separating the collection of the devices 112 into the sets and/or into groups (e.g., latency groups and/or transition groups). Additionally, the DR server 106 may be configured to consider latency when ordering one or more of the devices 112 in the sets and/or groups.

In addition, the DR server 106 may be configured to consider the latency of the devices 112 to determine whether to execute one or more micro DR events. For example, in circumstances in which the latency of the devices 112 is longer than a DR duration or a micro DR duration, a micro DR event may not be executed.

In some embodiments, the DR server 106 may designate sets of the collection of the devices 112 as an On-to-Off set 140A and an Off-to-On set 140B. Additionally, the DR server 106 may be configured to separate the collection of the devices 112 into the On-to-Off set 140A and the Off-to-On set 140B. The On-to-Off set 140A may include the devices 112 that have a current state of an On state. When signaled by the DR server 106, the devices 112 in the On-to-Off set 140A may transition to an Off state. Similarly, the Off-to-On set 140B may include the devices 112 that include a current state of the Off state. When signaled by the DR server 106, the devices in the Off-to-On set 140B may transition to the On state. In FIG. 1, the second device 112B may be included in the On-to-Off set 140A and the first device 112A and a third device 112C may be included in the Off-to-On set 140B. In the embodiments discussed herein, the On-to-Off set 140A and the Off-to-On set 140B may include other devices 112 not illustrated in FIG. 1.

The DR server 106 may be configured to form one or more latency groups 150A and 150B (generally, latency group 150 or latency groups 150). The DR server 106 may be configured to form one or more latency groups 150 from devices 112 of the Off-to-On set 140B and from the On-to-Off set 140A. The DR server 106 may form the latency groups 150 of the Off-to-On set 140B based on the lower curtailment margin. The DR server 106 may form the latency groups 150 of the On-to-Off set 140A based on the upper curtailment margin.

The DR server 106 may portion one or more transition groups 144A-144C (generally, transition group 144 or transition groups 144) from the devices 112 of the Off-to-On set 140B and the On-to-Off set 140A. For the devices 112 of the Off-to-On set 140B, the DR server 106 may portion the transition groups 144 based on device curtailment capacities of the devices 112 of the Off-to-On set 140B and a dynamic lower curtailment margin. For the devices 112 of the On-to-Off set 140A, the DR server 106 may portion the transition groups 144 based on device curtailment capacities of the devices 112 of the On-to-Off set 140A and a dynamic upper curtailment margin.

The DR server 106 may create transition group pairs from the transition groups 144. One or more of the transition group pairs may include one of the transition groups 144 formed from the devices 112 of the On-to-Off set 140A and one of the transition groups 144 formed from the devices of the Off-to-On set 140B.

During a DR event duration, the DR server 106 may execute a micro DR event. The micro DR event may include the state transitions in which the devices 112 in the transition group pairs transition from a current state to an alternative state such that an energy curtailment during the state transitions remains within the curtailment band.

In some embodiments, execution of the micro DR event may include the DR server 106 communicating to all of the devices 112 in a first transition group pair. Following a transition in state of all of the devices 112 in the first transition group pair, the DR server 106 may communicate to all the devices 112 in a second transition group pair.

In some embodiments, the DR server 106 may calculate transition group latencies for the transition groups 144 as the highest latency of one of the devices 112 included in the transition group 144. The DR server 106 may set a transition group pair latency as the higher of the transition group latencies of the transition groups 144 included in the transition group pair. The DR server 106 may also calculate a minimum latency for one or more of the transition groups 144 formed from the devices of the On-to-Off set 140A.

In these and other embodiments, to execute the micro DR event, the DR server 106 may communicate, at a given time, a transition signal to all of the devices in one of the transition group pairs. At a subsequent time, the DR server 106 may communicate another transition signal to all the devices 112 in the subsequent transition group pair. The subsequent time may be equal to a transition group pair latency for the transition group pair minus a minimum latency for the transition group formed from the devices 112 of the On-to-Off set 140A that is included in the subsequent transition group pair. The subsequent time may be represented by a subsequent time expression:

$$T_i = (\text{Latency}_{TGP_{i-1}}) - (\text{Min\_Latency}_{On\text{-}to\text{-}off\_TPG_i})$$

In the subsequent time expression, T represents the time. The variable i is an indexing variable that is representative of a number of the transition group pair to be signaled. Latency$_{TGP}$ represents the transition group pair latency of the transition group pair that was signaled immediately prior to the transition group pair to be signaled. Min_Latency$_{On\text{-}to\text{-}Off\_TPG}$ represents the minimum latency for the transition group formed for the devices 112 of the On-to-Off set 104A that is included in the transition group pair to be signaled.

In the DR system 100 of FIG. 1, the utility 104 may distribute energy to the sites 130. Accordingly, the micro DR events described with reference to FIG. 1 may include curtailment of electrical energy usage by the sites 130 and/or the devices 112. In some other embodiments, the utility 104 may provide another resource such as natural gas or water to the sites 130. Thus, in these other embodiments, the micro DR events may include curtailment of other resources. Moreover, in these and other embodiments, the devices 112 may include the devices 112 that may use another resource and accordingly be curtailed from use during micro curtailment events.

Modifications, additions, or omissions may be made to the DR system 100 without departing from the scope of the present disclosure. Specifically, FIG. 1 includes three customers 120, one DR server 106, one DR aggregator 102, one utility 104, and three sites 130 that each include one device 112. The present disclosure may apply to DR systems that may include one or more of the customers 120, one or more of the utilities 104, one or more of the DR aggregators 102, one or more of the DR servers 106, one or more of the sites 130 that each include one or more of the devices 112, or any combination thereof. The present disclosure may also apply to DR systems in which energy or any other resource may be curtailed.

Moreover, the separation of various components in the embodiments described herein is not meant to indicate that the separation occurs in all embodiments. It may be understood with the benefit of this disclosure that the described components may be integrated together in a single component or separated into multiple components.

FIGS. 2A-3B illustrate an example technique for execution of a micro DR event that may be implemented in the DR system 100 of FIG. 1. The technique for execution of the micro DR event is implemented such that during state transitions of devices, energy curtailment is maintained in a curtailment band. The curtailment band may be defined between an upper curtailment margin and a lower curtailment margin.

FIGS. 2A-2E depict tables 200A-200L that present an example portioning of an example collection of devices D1-D10 and E1-E10. FIGS. 3A and 3B depict a sequence of transition states 300A-300E according to the portioning of FIGS. 2A-2E.

The collection of devices may include devices having device identifiers (device ID) D1-D10 and E1-E10. The devices D1-D10 and E1-E10 may correspond to or include the devices 112 described with reference to FIG. 1. The collection of the devices D1-D10 and E1-E10 may be separated into an On-to-Off set, which may include the devices D1-D10 and into an Off-to-On set, which may include the devices E1-E10.

Tables 200A-200C, 200G, and 200J of FIGS. 2A, 2C, and 2D include the devices D1-D10 (e.g., the On-to-Off set) and tables 200D-200F, 200H, and 200K of FIGS. 2B, 2C and 2D include the devices E1-E10 (e.g., the Off-to-On set). Each of the tables 200A-200H and 200J and 200K include categories that are descriptive of the devices D1-D10 and E1-E10. The categories include latency, curtailment capacity, and device ID. The latency includes a time measurement indicative of the latency of implementing a state change in a device. The curtailment capacity includes an amount of electrical energy a device curtails when transitioned to an Off state. The device ID is the device identifier.

For example, with reference to the table 200A of FIG. 2A, a device D3 includes a curtailment capacity of six and a latency of fifty-five. The numerical values in the tables 200A-200K are used for illustrative purposes and do not represent an actual circumstance. However, an appropriate unit for curtailment capacity may include kilowatt-hours (kwh) or another power unit and an appropriate unit for latency may include seconds (s).

Tables 200A-200C of FIG. 2A depict formation of latency groups 203A and 203B from the devices D1-D10 and Tables 200D-200F depict formation of latency groups 203C and 203D from devices E1-E10. The latency groups 203A-203D are generally referred to as latency groups 203 or latency group 203. The formation of the latency groups 203 for the devices E1-E10 of the Off-to-On set may be based on a lower curtailment margin that is defined for the macro DR event. Similarly, the formation of the latency groups 203 for the devices D1-D10 of the On-to-Off set may be based on an upper curtailment margin that is defined for the macro DR event. In the example depicted in FIGS. 2A-3B, the upper curtailment margin is equal to 20 and the lower curtailment margin is equal to eighteen. These values of the upper and lower curtailment margins are included in tables 200D and 200A, respectively.

In the embodiment depicted in FIGS. 2A and 2B, the formation of the latency groups 203 generally includes three operations. First, initial latency groups 202A-202I (generally, initial latency group 202 or initial latency groups 202) may be calculated, then the latency groups 203 may be created from the initial latency groups 202. Finally, the latency groups 203 may be sorted based on the device curtailment capacities of the devices included in the latency groups 203. These operations may be used to form the latency groups 203 from the devices of the On-to-Off set (D1-D10) and to form the latency groups 203 from the devices of the Off-to-On set (E1-E10).

Table 200A of FIG. 2A and table 200D of FIG. 2B illustrate calculation of the initial latency groups 202. In tables 200A and 200D, the devices of the Off-to On set (E1-E 10) and the On-to-Off set (D1-D10) may be sorted in decreasing order by latency. For example, in table 200A, device D3 includes a higher latency than device D2, which has a higher latency than device D1, etc.

To form the initial latency groups 202 of the On-to-Off set, beginning at the device D3 of the On-to-Off set having a highest latency, the devices may be added to a first initial latency group 202A until a sum of the device curtailment capacities of the devices in the first initial latency group 202A exceeds the upper curtailment margin. Accordingly, the first initial latency group 202A may include the devices D3 and D2 because addition of the device D1 to the first initial latency group 202A may result in a sum of the device curtailment capacities of twenty-two, which is greater than the upper curtailment margin ("C_UPPER" in FIG. 2A) of twenty. Beginning at the next device D1, which was not added to the first initial latency group 202A, a second initial latency group 202B may be calculated by adding devices to the second initial latency group 202B until a sum of the device curtailment capacities of the devices in the second initial latency group 202B exceeds the upper curtailment margin. Accordingly, the second initial latency group 202B may include devices D1, D4, D9, and D6, because the sum of the device curtailment capacities for these four devices is twenty, which equals but does not exceed the upper curtailment margin of twenty. The remaining initial latency groups are calculated in a similar fashion for the remaining devices D1-D10 in the On-to-Off set, as depicted in table 200A of FIG. 2A, and for the devices E1-E10 in the Off-to-On set, as depicted in table 200D of FIG. 2B.

From the initial latency groups 202, a smallest latency (z) in tables 200A and 200D of the initial latency groups 202 may be recorded. For example, in table 200A of FIG. 2A, the smallest latency (z) of each of initial latency groups 202A-202D is recorded as, respectively, 53, 40, 21, and 10. Similarly, in table 200D of FIG. 2B, the smallest latency (z) of each of initial latency groups 202E-202I is recorded as, respectively, 55, 49, 35, 18, and 12.

Additionally, a cumulative sum, which is represented by (s) of the device curtailment capacities for each of the initial latency groups 202 may be calculated and recorded. For example, in table 200A of FIG. 2A, the cumulative sum for each of the initial latency groups 202A-202D is recorded as, respectively, 12, 20, 20, and 1. Similarly, in table 200D of FIG. 2B, the cumulative sum for each of the initial latency groups 202E-202I is recorded as, respectively, 18, 16, 11, 9, and 10.

Latency thresholds may also be calculated from the initial latency groups 202. The latency thresholds may relate to a remaining fraction of the upper curtailment margin or the lower curtailment margin if only the devices in an initial latency group 202 are included in a latency group 203.

The latency threshold may be defined according to latency expressions:

$$L\_threshold_i = z_i - l_{avg} \times \left(\frac{s_i}{C_m}\right)$$

$$l_{avg} = \left(\frac{1}{\sum_d c_d}\right) \sum_d c_d l_d$$

In the latency expressions, L-threshold represents the latency threshold. The variables i and d are indexing variables that represent the devices in an initial latency group. The variable z represents a smallest latency of one of the devices in an initial latency group 202. The parameter $l_{avg}$ represents a curtailment-weighted average latency. The value s represents the cumulative sum of curtailments for an initial latency group 202. The value $C_m$ represents an upper curtailment margin for an On-to-Off set and represents a lower curtailment margin for an Off-to-On set. The value $c_d$ represents a device curtailment capacity. The value $l_d$ represents a latency for a device. The tables 200A and 200D represent, respectively, an On-to-Off list and an Off-to-On list of initial latency groups 202 that may be generated.

From the initial latency groups 202, the latency groups 203 may be created. In the depicted embodiment, the latency groups may be created by starting from the beginning of the On-to-Off list (e.g., table 200A), adding the devices to a first latency group 203A until a latency of a device to be added to the first latency group 203A is less than the latency threshold of a corresponding one of the initial latency groups 202.

For example, in the depicted embodiments, the latency groups may be created according to an latency group equation:

Add device_j to $P_i$ until:

$L_{device\_j} < L\_threshold_i$

In the latency group equation, i and j represent an indexing variables. P represents the latency group. $L_{device}$ represents a latency of a device. L_threshold represents a latency threshold of a corresponding initial latency group. In the latency group equation, there may be a correspondency between the latency group and the latency threshold used to determine whether or not to include a device. Additionally, the latency thresholds for the On-to-Off set may not be used for latency groups created from the Off-to-On set.

For example, in creating the latency groups 203 from the initial latency groups 202, the latency threshold for the first initial latency group 202A is used in creating the first latency group 203A, the latency threshold for the second initial latency group 202B is used in creating the second latency group 203B, etc. for the On-to-Off set (D1-D10). When all the devices of the On-to-Off set have been added to a corresponding one of the latency groups 203, the remaining latency thresholds for initial latency groups 202 for the On-to-Off set are not used. Similarly, for the Off-to-On set (E1-E10), the latency threshold for the first initial latency group 202E of the initial latency groups 202 associated with the Off-to-On set is used in creating the first latency group 203C of the latency groups 203 associated with the Off-to-On set, the latency threshold for the next initial latency group 202F is used in creating the next latency group 203D, etc. When all the devices of the Off-to-On set have been added to a corresponding one of the latency groups 203, the remaining latency thresholds for initial latency groups 202 for the Off-to-On set are not used.

In table 200B, for instance, the first latency group 203A includes devices D3, D2, D1, D4, D9, D6, and D8 and stops at device D7. The latency of device D7 is twenty-six, which is less than the latency threshold of 29.49 of the initial latency group 202A, as depicted in table 200A. As such, the device D7 is not added to the first latency group 203A. Beginning at device D7, the second latency group 203B includes devices D7, D5, and D10, each of which is included in the second latency group 203B because each has a latency greater than the latency threshold of 0.83 of the initial latency group 202B.

The latency groups 203C and 203D for the Off-to-On set of FIG. 2B are created in a manner substantially the same. For example, beginning with device E5, devices are added to a third latency group 203C until a device latency is less than the latency threshold 14.48 of the initial latency group 202E. Because each of the devices E5, E3, E9, E1, E7, E6, E10, E8, and E4 has a latency greater than the latency threshold 14.48 of the initial latency group 202E, each of the devices E5, E3, E9, E1, E7, E6, E10, E8, and E4 is added to the latency group 203C. Because the device E2 has a latency of 12, which is less than the latency threshold 14.48 of the initial latency group 202E, it is not added to the latency group 203C. Instead, it is added to the next latency group 203D. To create the latency groups 203 from the initial latency groups for the Off-to-On sets, the latency threshold calculated for the first initial latency group from the devices in the Off-to-On set is used. For example, to create the third latency group 203C, the latency threshold for a fifth initial latency group 202E is used. Similarly, to create the fourth latency group 203D, the latency threshold for a sixth initial latency group 202F is used.

As shown in tables 200C and 200F, the latency groups 203 may then be sorted based on the device curtailment capacities of the devices included in the latency groups 203. For example, as shown in the tables 200C and 200F, the devices remain in the latency groups 203 and are sorted based on the device curtailment capacities in descending order from highest curtailment capacity to lowest curtailment capacity within each latency group 203.

Referring to FIG. 2C, On-to-Off transition groups 210A-210C may be portioned from the devices of the On-to-Off set as depicted in table 200G. Additionally, Off-to-On transition groups 212A-212D may be portioned from the devices of the Off-to-On set as depicted in table 200H. The transition groups 212A-212D and 210A-210C are generally referred to as transition groups 210/212. The On-to-Off transition groups 210A-210C are generally referred to as On-to-Off transition groups 210 and the Off-to-On transition groups 212A-212D are generally referred to as Off-to-On transition groups 212. Portioning the transition groups 210/212 from the devices of the On-to-Off and Off-to-On sets may include separating or dividing the devices of each of the sets into the transition groups 210/212.

The Off-to-On transition groups 212A-212D may be portioned based on device curtailment capacities of the devices of the Off-to-On set and/or a dynamic lower curtailment margin. Additionally, the On-to-Off transition groups 210A-210C may be portioned based on device curtailment capacities of the devices of the On-to-Off set and/or a dynamic upper curtailment margin.

The dynamic lower curtailment margin represents the lower curtailment margin modified to take into account a difference of the device curtailment capacities of the devices in previously formed Off-to-On transition groups 212 and On-to-Off transition groups 210. The dynamic upper curtailment margin represents the upper curtailment margin modified to take into account a difference of the device curtailment capacities of the devices in previously formed Off-to-On transition groups 212 and On-to-Off transition groups 210.

As discussed more below, the states of the devices in the transition groups 210/212 may be transitioned as transition group pairs 216 (discussed below). In each of the transition group pairs 216, some devices (e.g., the devices from On-to-Off set) may be transitioned from an On state to an Off state and some device (e.g., the devices from the Off-to-On set) may be transitioned from an Off state to an On state. The devices that transition to an Off state are curtailing energy and the devices that transition to an On state are acting as a load. The energy curtailed by the devices that are curtailing energy do not necessarily match, in amount, the load imposed by the devices that are acting as a load. For example, the devices that are curtailing energy (e.g., transitioning to an Off state) may curtail sixteen KWh while the devices that are acting as a load (e.g., transitioning to an On state) may impose fifteen KWh. Thus, after a transition of state of the devices in such a transition group pairs, there may be a net energy curtailment of one KWh. In some circumstances, there may be a net energy load. These net energy curtailments or load may be referred to as differences of the device curtailment capacities. The dynamic curtailment margins incorporate these differences from previously formed transition groups.

In some embodiments, the dynamic lower curtailment margin may be defined by a dynamic lower curtailment margin expression:

$$C_{dyn\_lower} = M_1 + C_1 + C_2 \ldots + C_{i-1}$$

Similarly, the dynamic upper curtailment margin may be defined by a dynamic upper curtailment margin expression:

$$C_{dyn\_upper} = M_2 - C_1 - C_2 \ldots - C_{i-1}$$

In the dynamic upper curtailment margin expression and the dynamic lower curtailment margin expression, the parameter $C_{dyn\_lower}$ represents the dynamic lower curtailment margin. The parameter $C_{dyn\_upper}$ represents the dynamic upper curtailment margin. The parameter $M_2$ represents the upper curtailment margin. The parameter $M_1$ represents the lower curtailment margin. The parameter C represents a difference of the device curtailment capacities of an Off-to-On transition group 212 formed from devices of the Off-to-On set and the device curtailment capacities of a corresponding On-to-Off transition group formed from devices of the On-to-Off set. The variable i is an indexing variable.

The portioning of the transition groups 210/212 from the devices may be based on latency groups 203 that are sorted based on the device curtailment capacities of the devices included in the latency groups. For example, the Off-to-On transition groups 212 may be based on the third and fourth latency groups 203C and 203D sorted as depicted in table 200F of FIG. 2B.

To portion the transition groups 210/212, one or more of the devices from the sorted latency groups 203 may be added to each of the transition groups 210/212 and one or more of the devices may not be added to each of the transition groups 210/212. For example, the devices may be added to a transition group 210/212 if a sum of the device curtailment capacities of the transition group 210/212, when the device is added to the transition group 210/212, does not exceed the dynamic lower or dynamic upper curtailment capacity. The devices may not be added to the transition groups 210/212 if the sum of the device curtailment capacities of the transition group, when the device is added to the transition group 210/212, exceeds the dynamic lower or dynamic upper curtailment capacity.

For example, with reference to table 200G of FIG. 2C, to portion a first On-to-Off transition group 210A, beginning with device D1, the devices may be considered for addition to the first On-to-Off transition group 210A. For the first On-to-Off transition group 210A, the dynamic upper curtailment margin may equal the upper curtailment margin (e.g., twenty in the example of FIG. 2A) using the dynamic upper curtailment margin expression above since no other transition groups have been formed yet.

Device D1 may be added to the first On-to-Off transition group 210A because the device curtailment capacity of ten does not exceed the dynamic upper curtailment margin. Additionally, the device D2 may be added to the first On-to-Off transition group 210A because the device curtailment capacity of device D2, which is six, when added to the device curtailment capacity of the first On-to-Off transition group 210A does not exceed the dynamic upper curtailment margin of twenty. At this point, the first On-to-Off transition group 210A has a (cumulative) device curtailment capacity of sixteen. The device D3 may not be added to the first On-to-Off transition group 210A because the device curtailment capacity of device D3, which is six, when added to the device curtailment capacity of the first On-to-Off transition group 210A of sixteen exceeds the dynamic upper curtailment margin of twenty (e.g., 22>20). Device D3 may thus be skipped.

Device D4 may be considered next. The device D4 may be added to the first On-to-Off transition group 210A because the device curtailment capacity of device D4, which is four, when added to the device curtailment capacity of sixteen of the first On-to-Off transition group 210A does not exceed the dynamic upper curtailment margin of twenty. No other devices of the On-to-Off set may be added to the first On-to-Off transition group 210A since, with inclusion of devices D1, D2, and D4, the On-to-Off transition group 210A has a curtailment capacity equal to the current dynamic upper curtailment margin.

The first Off-to-On transition group 212A may be portioned similarly to the first On-to-Off transition group 210A except the first Off-to-On transition group 212A is based upon the dynamic lower curtailment margin of eighteen.

After the first Off-to-On transition group 212A and the first On-to-Off transition group 210A are portioned, a difference of the device curtailment capacities of the first Off-to-On transition group 212A and the device curtailment capacities of the first On-to-Off transition group 210A may be calculated. The difference may be used to determine the dynamic upper curtailment margin and the dynamic lower curtailment margin according to the dynamic upper and lower curtailment margin expressions above.

In this example, the first Off-to-On transition group 212A has a device curtailment capacity of 18 (e.g., 11+7=20) and the first On-to-Off transition group 210A has a device curtailment capacity of 20 (e.g., 10+6+4=20). The difference of the two is equal to 2 and is the value of C1 in table 200I of FIG. 2C. According to the dynamic upper and lower curtailment margin expressions above, with a value of 2 for C1, the dynamic upper curtailment margin will be 18 as denoted at "C_DYN_UPPER_1" in table 200I of FIG. 2C and lower curtailment margins will be 20 as denoted by "C_DYN_LOWER_1" in table 200I of FIG. 2C.

A second Off-to-On transition group 212B and a second On-to-Off transition group 210B may be portioned based on the dynamic upper curtailment margin and the dynamic lower curtailment margin modified to take into account the difference of the device curtailment capacities. More particularly, the second Off-to-On transition group 212B and the second On-to-Off transition group 210B may be portioned based on C_DYN_UPPER_1 and C_DYN_LOWER_1.

After the second Off-to-On transition group 212B and the second On-to-Off transition group 210B are portioned, the difference of the device curtailment capacities of the second Off-to-On transition group 212B and of the device curtailment capacities of the second On-to-Off transition group 210B may be calculated and used to modify the dynamic upper curtailment margin and the dynamic lower curtailment margin.

In this example, the second Off-to-On transition group 212B has a device curtailment capacity of 20 and the second On-to-Off transition group 210B has a device curtailment capacity of 16. The difference between the two is −4, which is the value of C2 in table 200I of FIG. 2C. The inclusion of the negative is indicative of the curtailment excess. According to the dynamic upper and lower curtailment margin expressions above, with a value of 2 for C1 and a value of −4 for C2, the dynamic upper curtailment margin will be modified to 22 and the dynamic lower curtailment margin will be modified to 16, as denoted at "C_DYN_UPPER_2" and "C_DYN_LOWER_2" in table 200I of FIG. 2C.

A third Off-to-On transition group 212C and a third On-to-Off transition group 210C may be portioned based on the dynamic upper curtailment margin and the dynamic lower curtailment margin modified to take into account the differences of the device curtailment capacities. More particularly, the third Off-to-On transition group 212C and the third On-to-Off transition group 210C may be portioned based on C_DYN_UPPER_2 and C_DYN_LOWER_2.

After the third Off-to-On transition group 212C and the third On-to-Off transition group 210C are portioned, the sum of the device curtailment capacities of the third Off-to-On transition group 212C and of the device curtailment capacities of the third On-to-Off transition group 210C may be calculated and used to modify the dynamic upper curtailment margin and the dynamic lower curtailment margin. In this example, the third Off-to-On transition group 212C has a device curtailment capacity of 12 and the third On-to-Off transition group 210C has a device curtailment capacity of 17. The difference between the two is −5, which is the value of C3 in table 200I of FIG. 2C. According to the dynamic upper and lower curtailment margin expressions above, with a value of 2 for C1, a value of −4 for C2, and a value of −5 for C3, the dynamic upper curtailment margin will be changed to 27 and the dynamic lower curtailment margin will be changed to 11, as denoted at "C_DYN_UPPER_3" and "C_DYN_LOWER_3" in table 200I of FIG. 2C.

Referring to FIG. 2D, the devices D1-D10 and E1-E10 may be reorganized into the transition groups 210/212. In FIG. 2D, table 200J depicts the On-to-Off transition groups 210A-210C and table 200K depicts the Off-to-On transition groups 212A-212D.

Figure 2E:
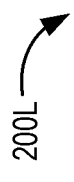
FIG. 2E illustrates a portion of an example technique for execution of the micro DR event that may be implemented in the DR system of FIG. 1.
Figure 3A:
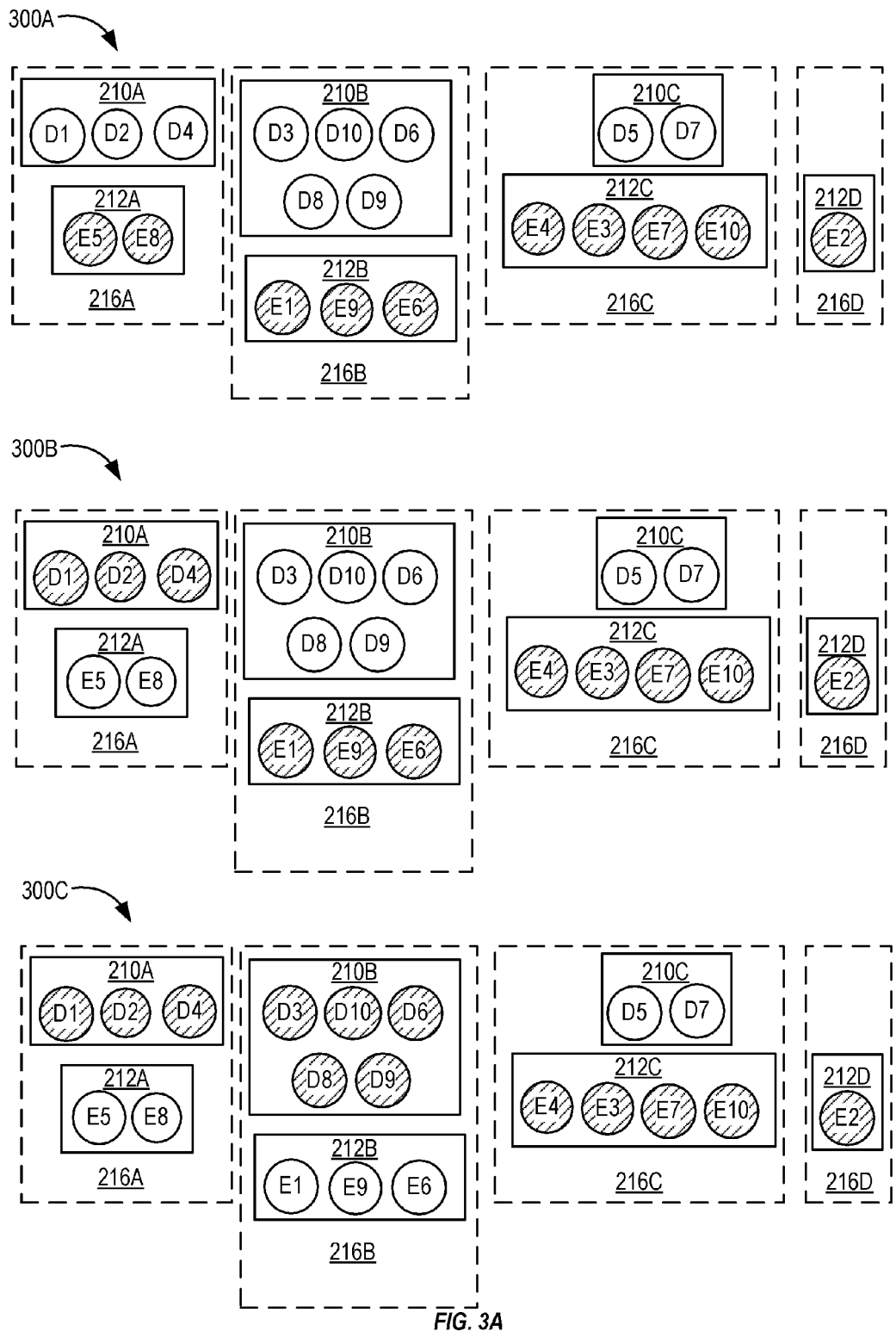
FIG. 3A depicts a portion of a sequence of transition states according to an example portioning of FIGS. 2A-2E.
Figure 3B:
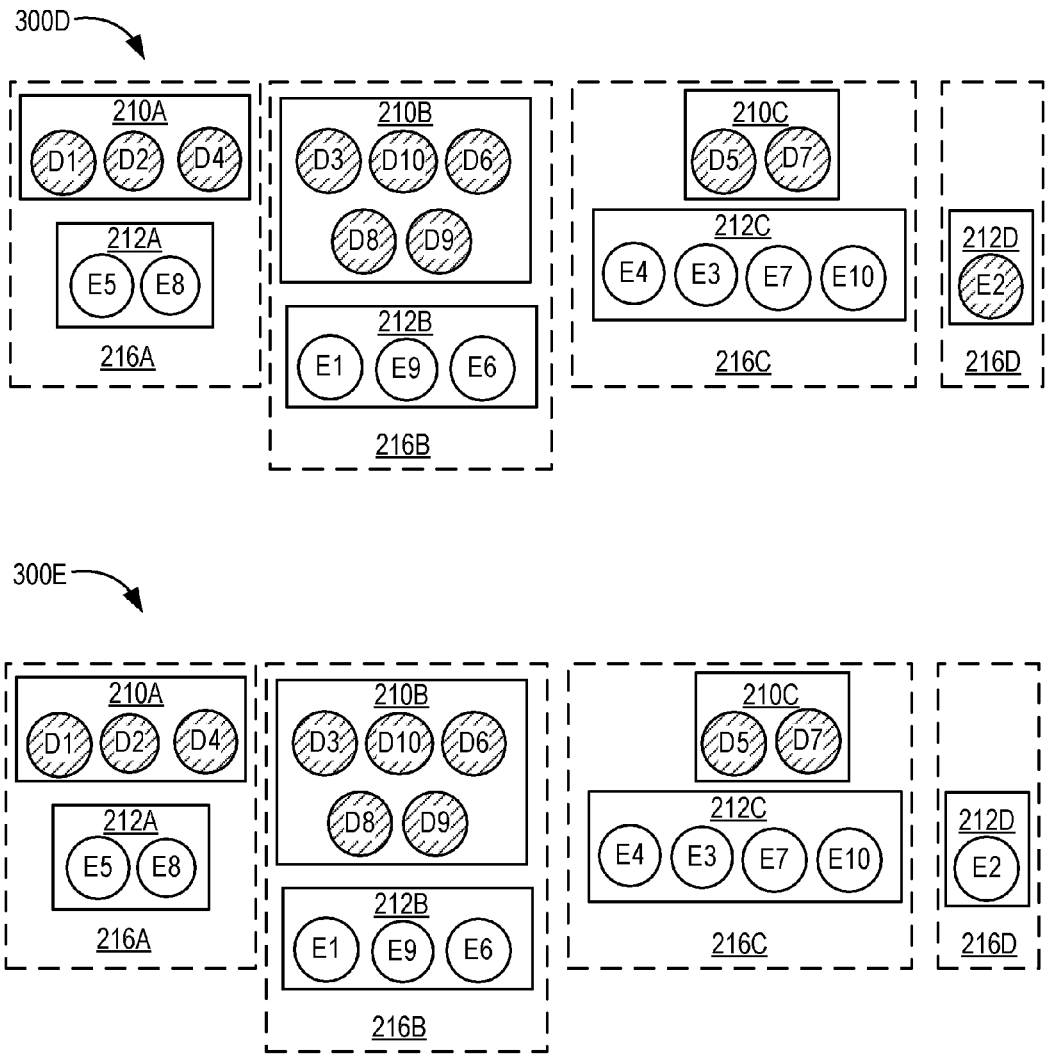
FIG. 3B depicts a portion of a sequence of transition states according to an example portioning of FIGS. 2A-2E.

Referring to FIG. 2E, one or more transition group pairs 216 may be created from the transition groups 210/212. One or more of the transition group pairs 216 may include one of the On-to-Off transition groups 210 and one of the Off-to-On transition groups 212.

The designation as a "pair" is used without necessarily limiting the transition groups 212/210 included therein to exactly two. For instance, in the depicted example, there is one transition group pair 216D that does not include an On-to-Off transition group 210. In these circumstances, the transition group "pair" 216D may only include one transition group 212 or 210. Additionally or alternatively, in these circumstances a leftover transition group 212/210 may be added to another transition group pair 216. Accordingly, a transition group "pair" 216 may include three transition groups 210/212, two On-to-Off transition groups 210 and one Off-to-On transition group 212 or vice versa.

Referring to FIGS. 2D and 2E transition group latencies may be calculated for the transition groups 210/212 as a highest latency of one of the devices D1-D10 or E1-E10 included in the transition group 210/212. A transition group pair latency may be set as the higher of the transition group latencies of the transition groups included in the transition group pair. Additionally, a minimum latency for one or more of the On-to-Off transition groups 210 may be calculated.

FIGS. 3A and 3B depict devices D1-D10 and E1-E10 during an example sequence of transition states 300A-300E according to the example portioning of FIGS. 2A-2E. The transition states 300A-300E may be included in execution of a micro DR event. In general, the execution of a micro DR event may include communicating signals to transition state to one or more of the devices in each of the transition group pairs 216 in an order. Generally, the order includes signaling a first transition group pair 216A (see FIG. 2E), then signaling a second transition group pair 216B (see FIG. 2E), etc.

In each of the transition states 300A-300D, the devices that are white designate devices in an On state. The devices that include a diagonal-lined fill designate devices in an Off state. For example, a first transition state 300A depicts an initial state. In the initial state, the On-to-Off set D1-D10 are in the On state and the Off-to-On set E1-E10 are in the Off state.

Between the first transition state 300A and a second transition state 300B, signals to transition state may be communicated to the first transition group pair 216A (e.g., the devices D1, D2, D4, E5, and E8). In the second transition state 300B, the first transition group pair 216A has transitioned its state. A second transition group pair 216B, a third transition group pair 216C, and device E2 are in the state of the first transition state 300A. The communication of the signals to the first transition group pair 216A to transition state that transition the first transition state 300A to the second transition state 300B may be communicated at a first time. The first time may be a beginning of a DR event duration, for instance.

Between the second transition state 300B and a third transition state 300C, signals to transition state may be communicated to the second transition group pair 216B (e.g., devices D3, D10, D6, D8, D9, E1, E9, and E6). In the third transition state 300C, the first and second transition group pairs 216A and 216B have transitioned state compared to the first transition state 300A. The third transition group pair 216C and the device E2 remain in the state of the first transition state 300A.

The communication of the signals to the second transition group pair 216B that transition the second transition state 300B to the third transition state 300C may be communicated at a second time that follows the first time. In some embodiments, the second time at which the second transition group pair 216B is signaled may be equal to a transition group pair latency of a transition group pair minus the minimum latency for the transition group formed from the devices of the On-to-Off set that is included in the subsequent transition group pair. For example, for the transition from the first transition state 300A to the second transition state 300B, the transition group pair latency may be the transition group pair latency of the first transition group pair 216A. The transition group pair latency of the first transition group pair 216A is sixty seconds as indicated in FIG. 2E. The minimum latency for the transition group formed from the devices of the On-to-Off set may include the minimum latency for the second On-to-Off transition group 210B. The minimum latency for the second On-to-Off transition group 210B is the latency for device D10, which is ten seconds. Accordingly, the communication of the signal to transition from the first transition state 300A to the second transition state 300B may occur at a second time that is fifty seconds after the first time.

In some embodiments, the signal to transition from the first transition state 300A to the second transition state 300B may occur after the devices in the first transition group pair 216A have completed transition (e.g., from a current state to an alternative state). Generally, in these embodiments, the second time may occur after the first time by an amount of time equal to the transition group pair latency (e.g., sixty seconds).

Between the third transition state 300C and a fourth transition state 300D, signals to transition state may be communicated to the third transition group pair 216C (e.g., devices D5, D7, E3, E4, E7, and E10). In the fourth transition state 300D, the first, second, and third transition group pairs 216A-216C have transitioned state compared to the first transition state 300A. The device E2 is in the state of the first transition state 300A.

Communication of the signals to the third transition group pair 216C to transition from the third transition state 300C to the fourth transition state 300D may occur at a third time. The third time may be measured from the first time. Accordingly, the third time may be a sum of the transition group pair latencies of the first and second transition group pairs 216A and 216B (e.g., sixty seconds and fifty-five seconds from FIG. 2E or a total of one-hundred and fifteen seconds). Alternatively, the third time may be calculated based on a minimum latency of the third On-to-Off transition group 210C of device D7, as described above.

Between the fourth transition state 300D and a fifth transition state 300E, signals to transition state may be communicated to the fourth transition group pair 216D (e.g., device E2). In the fourth transition state 300D, the first, second, third, and fourth transition group pairs 216A-216D have transitioned their states compared to the first transition state 300A.

Figure 4A:
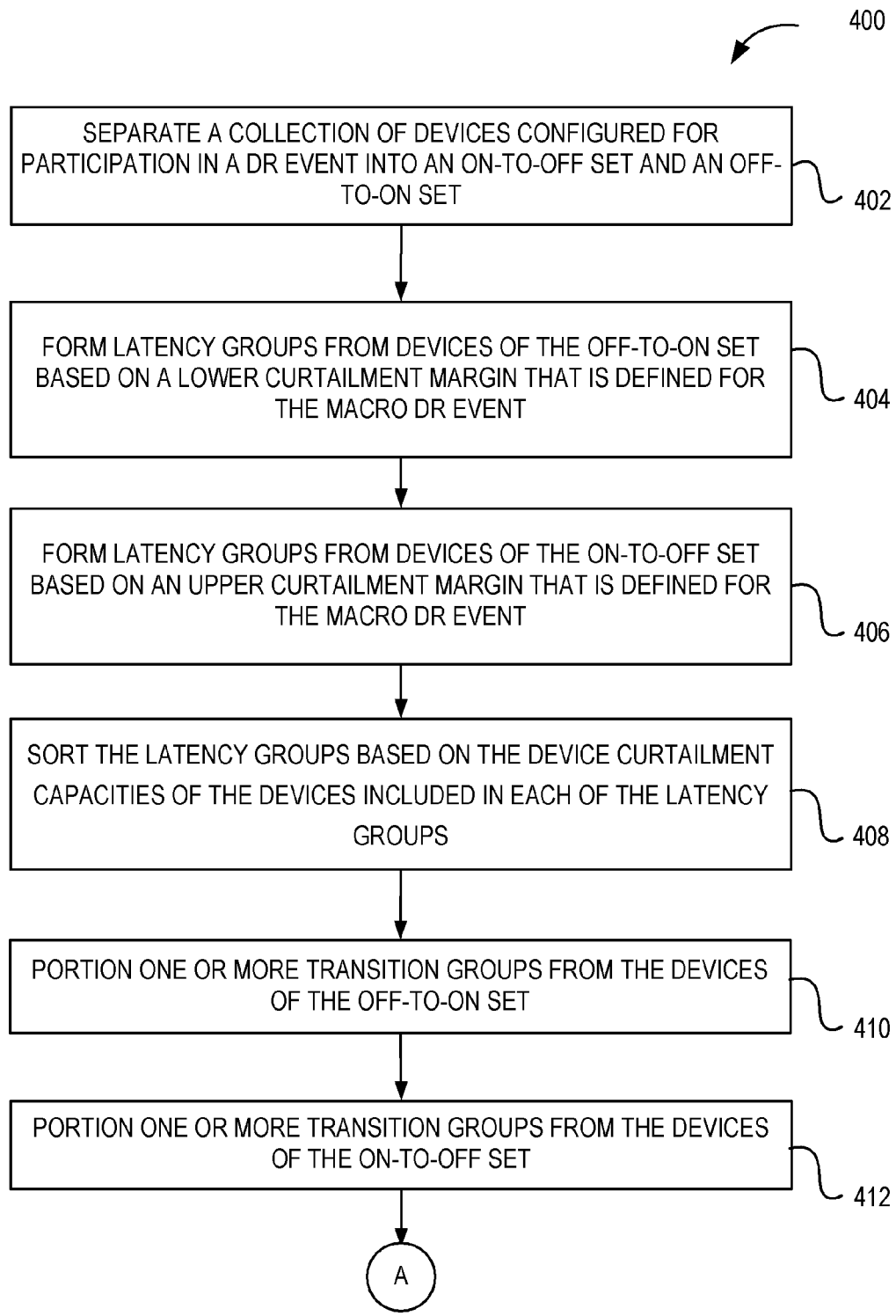
FIGS. 4A and 4B are a flow diagram of an example method of executing a macro DR event.
Figure 4B:
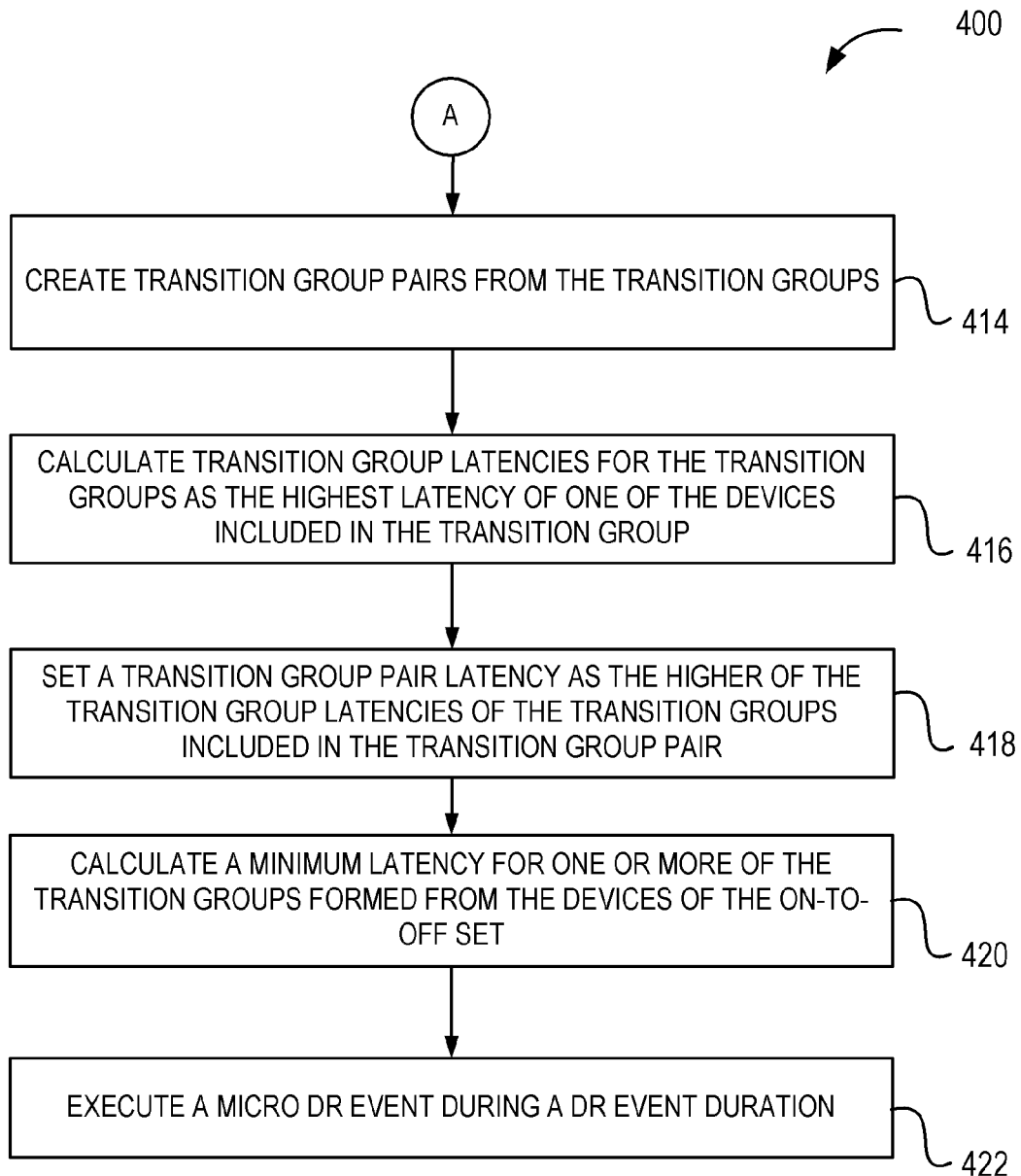

FIGS. 4A and 4B are a flow diagram of an example method 400 of executing a macro DR event, arranged in accordance with at least one embodiment described herein. Although illustrated as discrete blocks, various blocks may be divided into additional blocks, combined into fewer blocks, or eliminated, depending on the desired implementation.

The method 400 may begin at block 402. At block 402, a collection of devices configured for participation in the DR event may be separated into an On-to-Off set and an Off-to-On set. In some embodiments, the devices are associated with multiple customers. Additionally or alternatively, the devices may be enrolled in a DLC DR program or an Energy Management System (EMS) DR program. The devices may include one or more of an A/C unit, a water heater, a household appliance, a piece of industrial equipment, a refrigerator, a fan, a freezer, a heater, a ventilation unit, a thermostatically controlled unit, an appliance charging device, an electric vehicle charging device, a pool pump, and a pool heater.

At block 404, one or more latency groups may be formed from devices of the Off-to-On set based on a lower curtailment margin that is defined for the macro DR event. At block 406, one or more latency groups may be formed from devices of the On-to-Off set based on an upper curtailment margin that is defined for the macro DR event.

At block 408, the latency groups may be sorted based on the device curtailment capacities of the devices included in the latency groups. At block 410, one or more transition groups may be portioned from the devices of the Off-to-On set. The transition groups may be portioned based on device curtailment capacities of the devices of the Off-to-On set and/or a dynamic lower curtailment margin. The dynamic lower curtailment margin represents the lower curtailment margin modified to take into account a difference of the device curtailment capacities of the devices in previously formed transition groups.

In some embodiments, the portioning the transition groups from the devices of the Off-to-On set may be based on latency groups formed from the devices of the Off-to-On set that are sorted based on the device curtailment capacities of the devices included in the latency groups. One or more of the devices from the sorted latency groups may be added to each of the transition groups and one or more of the devices may not be added to each of the transition groups. For example, a corresponding one of the devices may be added to a transition group if a sum of the device curtailment capacities of the transition group, when the corresponding device is added to the transition group, does not exceed the dynamic lower curtailment capacity. The corresponding device may not be added to the transition group if the sum of the device curtailment capacities of the transition group, when the corresponding device is added to the transition group, exceeds the dynamic lower curtailment capacity.

At block 412, transition groups may be portioned from the devices of the On-to-Off set. The transition groups may be based on the device curtailment capacities of the devices of the On-to-Off set and/or a dynamic upper curtailment margin. The dynamic upper curtailment margin modifies the upper curtailment margin by a difference of the device curtailment capacities of the devices in previously formed transition groups.

In some embodiments, the portioning of the transition groups from the devices of the On-to-Off set may be based on sorted latency groups formed from the devices of the On-to-Off set that are sorted based on the device curtailment capacities of the devices included in the latency groups.

For example, from the sorted latency groups, one or more of the devices may be added to each of the transition groups and one or more of the devices may not be added to each of the transition groups. One or more of the devices from the sorted latency groups may be added to each of the transition groups and one or more of the devices may not be added to each of the transition groups. For example, a corresponding one of the devices may be added to a transition group if a sum of the device curtailment capacities of the transition group, when the corresponding device is added to the transition group, does not exceed the dynamic upper curtailment capacity. The corresponding device may not be added to the transition group if the sum of the device curtailment capacities of the transition group, when the corresponding device is added to the transition group, exceeds the dynamic upper curtailment capacity.

At block 414, transition group pairs may be created from the transition groups. One or more of the transition group pairs may include one of the transition groups formed from the devices of the On-to-Off set and one of the transition groups formed from the devices of the Off-to-On set. At block 416, transition group latencies may be calculated for the transition groups as a highest latency of one of the devices included in the transition group. At block 418, a transition group pair latency may be set as the higher of the transition group latencies of the transition groups included in the transition group pair. At block 420, a minimum latency for one or more of the transition groups formed from the devices of the On-to-Off set may be calculated.

At block 422, a micro DR event may be executed during a DR event duration. The micro DR event may include state transitions in which the devices in the transition group pairs transition from a current state to an alternative state such that an energy curtailment during the state transitions remains within the curtailment band defined between the upper curtailment margin and the lower curtailment margin.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

In some embodiments, execution of the micro DR event includes communicating to all of the devices in a first transition group pair of the transition group pairs a first transition signal. In these and other embodiments, following a transition in state of all of the devices in the first transition group pair, the execution of the micro DR event may include communicating to all the devices in a second transition group pair of the transition group pairs a second transition signal.

In some embodiments, execution of the micro DR event includes communicating to all of the devices in a first transition group pair of the transition group pairs a first transition signal. The first transition signal may be communicated at a first time.

At a second time, which may follow the first time, a second transition signal may be communicated to all the devices in a second transition group pair of the transition group pairs. In these and other embodiments, the second time may be equal to a transition group pair latency for the first transition group minus the minimum latency for the transition group formed from the devices of the On-to-Off set that is included in the second transition group pair.

Figure 5:
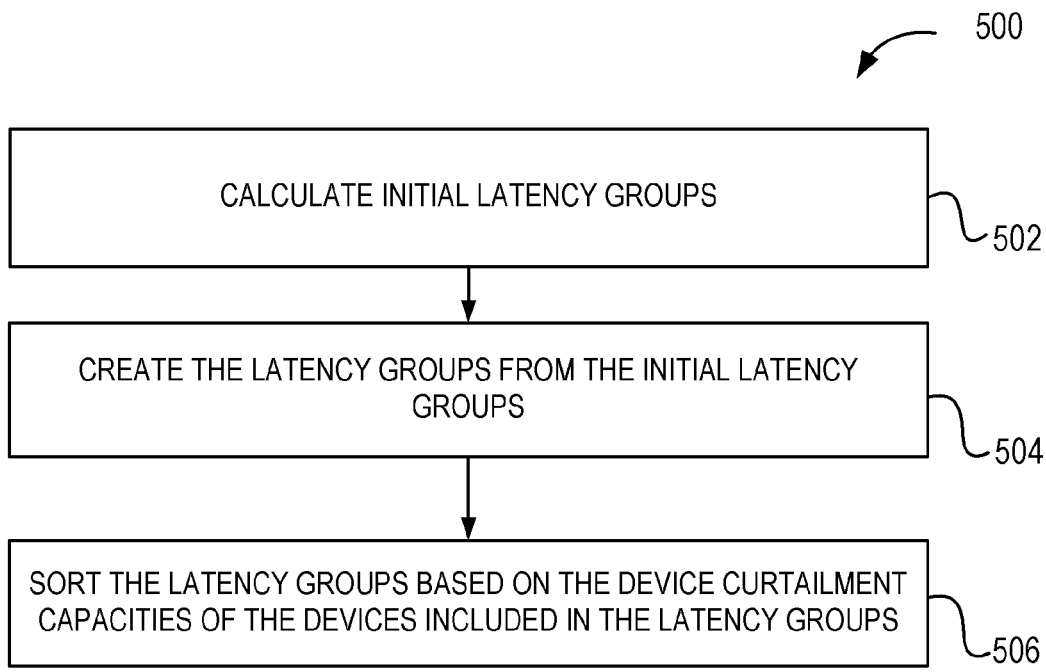
FIG. 5 is a flow diagram of an example method of forming a latency group.

FIG. 5 is a flow diagram of an example method 500 of forming a latency group, arranged in accordance with at least one embodiment described herein. Although illustrated as discrete blocks, various blocks may be divided into additional blocks, combined into fewer blocks, or eliminated, depending on the desired implementation.

The method 500 may begin at block 502. At block 502, initial latency groups may be calculated, e.g., as described above. At block 504, the latency groups may be created from the initial latency groups. At block 506, the latency groups may be sorted based on the device curtailment capacities of the devices included in each of the latency groups. The method 500 may be used to form the latency groups from the devices of the On-to-Off set and to form the latency groups from the devices of the Off-to-On set.

Figure 6:
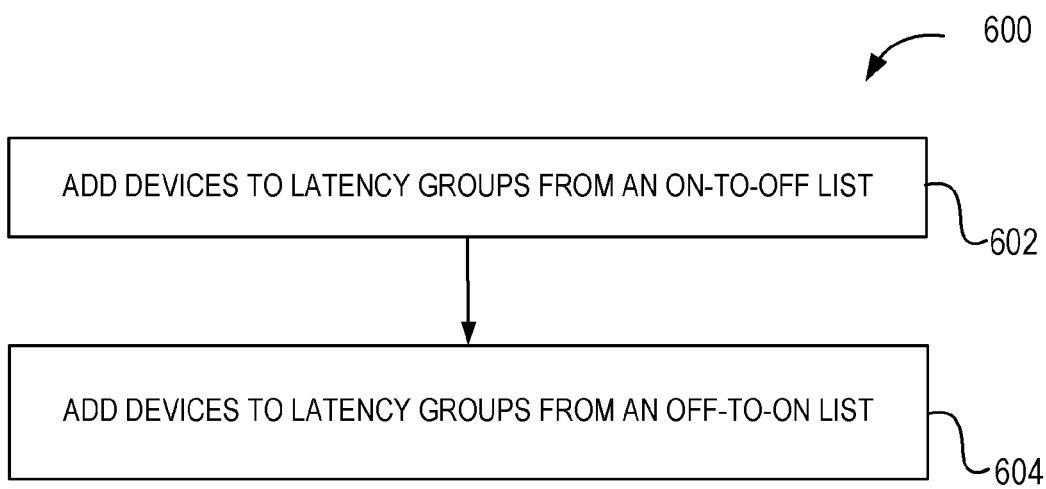
FIG. 6 is a flow diagram of an example method of creating a latency group from an initial latency group.

FIG. 6 is a flow diagram of an example method 600 of creating a latency group from an initial latency group, arranged in accordance with at least one embodiment described herein. Although illustrated as discrete blocks, various blocks may be divided into additional blocks, combined into fewer blocks, or eliminated, depending on the desired implementation. The method 600 of FIG. 6 is an example implementation of block 504 of FIG. 5.

The method 600 may begin at block 602. At block 602, devices may be added to latency groups from an On-to-Off list. For example, a first device having a highest latency of the On-to-Off list may be added to a first latency groups. The devices from the On-to-Off list may be added to the latency groups in an order in which the devices appeal in the On-to-Off list until a latency of a device to be added is less than a first latency threshold.

At block 604, devices may be added to latency groups from an Off-to-On list. For example, a second device having the highest latency of the Off-to-On list may be added to a second latency group. The devices may be added to the second latency group in an order in which the devices appear in the Off-to-On list until a latency of a device to be added is less than a second latency threshold. The first and second latency thresholds may be related to a remaining fraction of an curtailment margin (e.g., upper or lower) if only the devices in an initial latency group are included in the latency group.

Figure 7:
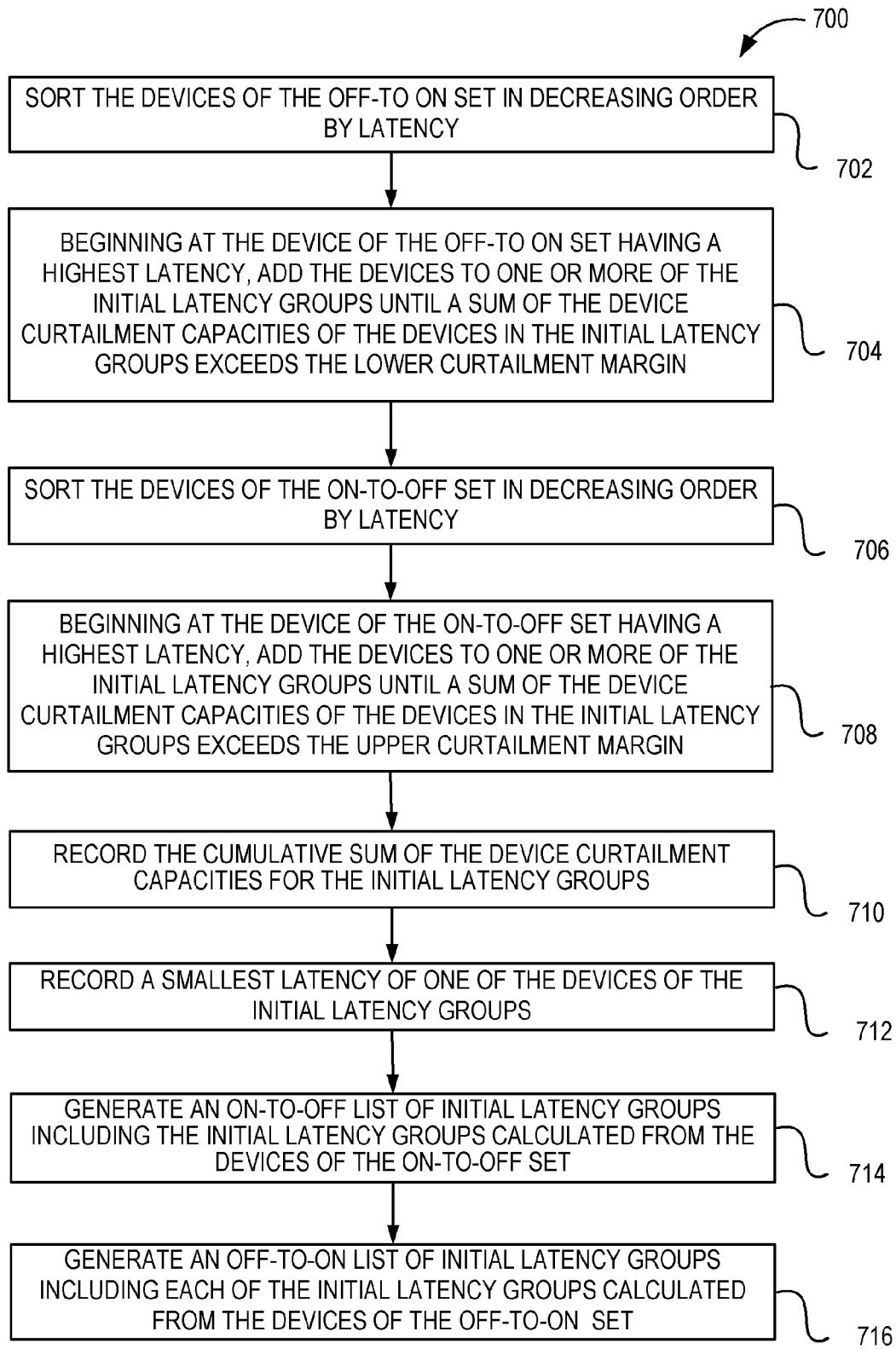
FIG. 7 is a flow diagram of an example method of calculating an initial latency group, all arranged in accordance with at least one embodiment described herein.

FIG. 7 is a flow diagram of an example method 700 of calculating an initial latency group, arranged in accordance with at least one embodiment described herein. Although illustrated as discrete blocks, various blocks may be divided into additional blocks, combined into fewer blocks, or eliminated, depending on the desired implementation. The method 700 of FIG. 7 is an example implementation of block 502 of FIG. 5.

The method 700 may begin at block 702. At block 702, the devices of the Off-to On set may be sorted in decreasing order by latency. At block 704, beginning at the device of the Off-to On set having a highest latency, devices may be added to an initial latency group until a sum of the device curtailment capacities of the devices in the initial latency group exceeds the lower curtailment margin. The device that causes the sum of the device curtailment capacities of the devices in the initial latency group to exceed the lower curtailment margin is not added to the initial latency group with the preceding devices, but is instead the first device included in the next initial latency group to be formed. The formation of initial latency groups may continue in this manner until all of the sorted devices are added to a corresponding initial latency group and such that none of the initial latency groups has a cumulative device curtailment capacity that exceeds the lower curtailment margin.

At block 706, the devices of the On-to-Off set may be sorted in decreasing order by latency. At block 708, beginning at the device of the On-to-Off set having a highest latency, devices may be added to an initial latency group until a sum of the device curtailment capacities of the devices in the initial latency group exceeds the upper curtailment margin. The device that causes the sum of the device curtailment capacities of the devices in the initial latency group to exceed the upper curtailment margin is not added to the initial latency group with the preceding devices, but is instead the first device included in the next initial latency group to be formed. The formation of initial latency groups may continue in this manner until all of the sorted devices are added to a corresponding initial latency group and such that none of the initial latency groups has a cumulative device curtailment capacity that exceeds the upper curtailment margin.

At block 710, the cumulative sum of the device curtailment capacities for the initial latency groups may be recorded. At block 712, a smallest latency of one of the devices of each of the initial latency groups may be recorded. At block 714, an On-to-Off list of initial latency groups may be generated that includes the initial latency groups calculated from the devices of the On-to-Off set. At block 716, an Off-to-On list of initial latency groups may be generated that includes the initial latency groups calculated from the devices of the Off-to-On set.

The methods 400, 500, 600, and 700 may be performed in a DR system such as the DR system 100 of FIG. 1 in which the utility 104 provides energy to the sites 130. Similar methods may be implemented with necessary modifications in systems in which other resources are provided by the utility 104.

One or more of the methods 400, 500, 600, and 700 may be programmably performed in some embodiments by the DR server 106 described with reference to FIG. 1. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform one or more of the methods 400, 500, 600, and 700. Additionally or alternatively, the DR server 106 may include the processor 134 described above that is configured to execute computer instructions to cause the DR server 106 or another computing device to perform the one or more of the methods 400, 500, 600, and 700.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of executing a macro demand response (DR) event, the method comprising:
   separating, by a DR controller server, a collection of devices configured for participation in the macro DR event into an On-to-Off DR device set (On-to-Off set) and an Off-to-On DR device set (Off-to-On set);
   forming, by the DR controller server, one or more latency groups from devices of the Off-to-On set based on a lower curtailment margin that is defined for the macro DR event;
   forming, by the DR controller server, one or more latency groups from devices of the On-to-Off set based on an upper curtailment margin that is defined for the macro DR event;
   portioning, by the DR controller server, one or more transition groups from the devices of the Off-to-On set based on device curtailment capacities of the devices of the Off-to-On set and a dynamic lower curtailment margin that is a modification of the lower curtailment margin that takes into account a difference of device curtailment capacities of devices in previously formed transition groups;
   portioning, by the DR controller server, one or more transition groups from the devices of the On-to-Off set based on the device curtailment capacities of the devices of the On-to-Off set and a dynamic upper curtailment margin that is a modification of the upper curtailment margin that takes into account a difference of the device curtailment capacities of the devices in previously formed transition groups;
   creating, by the DR controller server, transition group pairs from the transition groups, one or more of the transition group pairs including one of the transition groups formed from the devices of the On-to-Off set and one of the transition groups formed from the devices of the Off-to-On set; and
   during a DR event duration, executing, by the DR controller server, a micro DR event that includes state transitions in which the devices in the transition group pairs transition from a current state to an alternative state such that an energy curtailment during the state transitions remains within a curtailment band defined between the upper curtailment margin and the lower curtailment margin.

2. The method of claim 1, wherein executing the micro DR event includes:
   communicating to all of the devices in a first transition group pair of the transition group pairs a first transition signal; and
   following a transition in state of all of the devices in the first transition group pair, communicating to all the devices in a second transition group pair of the transition group pairs a second transition signal.

3. The method of claim 1, further comprising:
   calculating transition group latencies for each of the transition groups as the highest latency of one of the devices included in the transition group;
   setting a transition group pair latency as the higher of the transition group latencies of the transition groups included in each transition group pair;
   calculating a minimum latency for one or more of the transition groups formed from the devices of the On-to-Off set,
   wherein executing the micro DR event includes:
     at a first time, communicating to all of the devices in a first transition group pair of the transition group pairs a first transition signal; and
     at a second time, communicating to all the devices in a second transition group pair of the transition group pairs a second transition signal,
     wherein the second time is equal to a transition group pair latency for the first transition group minus the minimum latency for the transition group formed from the devices of the On-to-Off set that is included in the second transition group pair.

4. The method of claim 1, wherein forming the latency groups from the devices of the On-to-Off set and forming the latency groups from the devices of the Off-to-On set include:
   calculating initial latency groups;
   creating the latency groups from the initial latency groups; and
   sorting the latency groups based on the device curtailment capacities of the devices included in the latency groups.

5. The method of claim 4, wherein the calculating the initial latency groups includes:
   sorting the devices of the Off-to On set in decreasing order by latency;
   beginning at the device of the Off-to On set having a highest latency, adding the devices to the initial latency groups until a sum of the device curtailment capacities of the devices in the initial latency groups exceeds the lower curtailment margin;
   sorting the devices of the On-to-Off set in decreasing order by latency;
   beginning at the device of the On-to-Off set having a highest latency, adding the devices to the initial latency groups until a sum of the device curtailment capacities of the devices in the initial latency groups exceeds the upper curtailment margin;
   recording a cumulative sum of the device curtailment capacities for each of the initial latency groups and a smallest latency of one of the devices of each of the initial latency groups; and
   generating an On-to-Off list that includes the initial latency groups calculated from the devices of the On-to-Off set and an Off-to-On list that includes the initial latency groups calculated from the devices of the Off-to-On set.

6. The method of claim 5, wherein creating latency groups includes:
   adding a first device having a highest latency of the On-to-Off list to a first latency group;
   continuing to add devices to the first latency group in an order in which the devices appear in the On-to-Off list until a latency of a device to be added is less than a first latency threshold;
   adding a second device having a highest latency of the Off-to-On list to a second latency group; and
   continuing to add devices to the second latency group in an order in which the devices appear in the Off-to-On list until a latency of a device to be added is less than a second latency threshold.

7. The method of claim 6, wherein the first and second latency thresholds are defined according to expressions:

$$L\_threshold_i = z_i - l_{avg} \times \left(\frac{s_i}{C_m}\right)$$

$$l_{avg} = \left(\frac{1}{\sum_d c_d}\right) \sum_d c_d l_d;$$

wherein:
L_threshold represents the latency threshold;
i and d are indexing variables;
z represents a smallest latency of one of the devices in an initial latency group;
$l_{avg}$ represents a curtailment-weighted average latency;
s represents a cumulative sum of curtailments for an initial latency group;
$C_m$ represents an upper curtailment margin for an On-to-Off set and represents a lower curtailment margin for an Off-to-On set;
$C_d$ represents a device curtailment capacity; and
$l_d$ represents a latency for a device.

8. The method of claim 1, further comprising sorting each of the latency groups based on the device curtailment capacities of the devices included in each of the latency groups, wherein:
the portioning the transition groups from the devices of the On-to-Off set includes:
from the sorted latency groups of the devices of the On-to-Off set, adding the devices to a transition group if a sum of the device curtailment capacities of the transition group when the device is added to the transition group does not exceed a dynamic upper curtailment capacity, and
not adding the device to the transition groups if the sum of the device curtailment capacities of the transition group when the device is added to the transition group exceeds the dynamic upper curtailment capacity; and the portioning the transition groups from the devices of the Off-to-On set includes:
from the sorted latency groups of the devices of the Off-to-On set, adding the devices to a transition group if a sum of the device curtailment capacities of the transition group when the device is added to the transition group does not exceed a dynamic lower curtailment capacity, and
not adding the device to the transition groups if the sum of the device curtailment capacities of the transition group when the device is added to the transition group exceeds the dynamic lower curtailment capacity.

9. The method of claim 1, wherein:
the dynamic lower curtailment margin is defined by a dynamic lower curtailment margin expression:

$$C_{dyn\_lower} = M_1 + C_1 + C_2 \ldots + C_{i-1}; \text{ and}$$

the dynamic upper curtailment margin is defined by a dynamic upper curtailment margin expression:

$$C_{dyn\_upper} = M_2 - C_1 - C_2 \ldots - C_{i-1};$$

wherein:
$C_{dyn\_lower}$ represents the dynamic lower curtailment margin;
$C_{dyn\_upper}$ represents the dynamic upper curtailment margin;
$M_2$ represents the upper curtailment margin;
$M_1$ represents the lower curtailment margin;
C represents a difference of the device curtailment capacities of a transition group formed from devices of the Off-to-On set and the device curtailment capacities of a corresponding transition group formed from devices of the On-to-Off set; and
i is an indexing variable.

10. The method of claim 1, wherein:
the devices are associated with multiple customers and include one or more of an air-conditioner (A/C) unit, a water heater, a household appliance, a piece of industrial equipment, a refrigerator, a fan, a freezer, a heater, a ventilation unit, a thermostatically controlled unit, an appliance charging device, an electric vehicle charging device, a pool pump, and a pool heater, and
the devices are enrolled in a Direct Load Control (DLC) DR program or an Energy Management System (EMS) DR program.

11. A non-transitory computer-readable medium having encoded therein programming code executable by one or more processors to perform operations comprising:
separating a collection of devices configured for participation in a macro demand response (DR) event into an On-to-Off DR device set (On-to-Off set) and an Off-to-On DR device set (Off-to-On set);
forming one or more latency groups from devices of the Off-to-On set based on a lower curtailment margin that is defined for the macro DR event;
forming one or more latency groups from devices of the On-to-Off set based on an upper curtailment margin that is defined for the macro DR event;
portioning one or more transition groups from the devices of the Off-to-On set based on device curtailment capacities of the devices of the Off-to-On set and a dynamic lower curtailment margin that is a modification of the lower curtailment margin that takes into account a difference of device curtailment capacities of devices in previously formed transition groups;
portioning one or more transition groups from the devices of the On-to-Off set based on the device curtailment capacities of the devices of the On-to-Off set and a dynamic upper curtailment margin that is a modification of the upper curtailment margin that takes into account a difference of the device curtailment capacities of the devices in previously formed transition groups;
creating transition group pairs from the transition groups, one or more of the transition group pairs including one of the transition groups formed from the devices of the On-to-Off set and one of the transition groups formed from the devices of the Off-to-On set; and
during a DR event duration, executing a micro DR event that includes state transitions in which the devices in the transition group pairs transition from a current state to an alternative state such that an energy curtailment during the state transitions remains within a curtailment band defined between the upper curtailment margin and the lower curtailment margin.

12. The non-transitory computer-readable medium of claim 11, wherein the executing the micro DR event includes:
communicating to all of the devices in a first transition group pair of the transition group pairs a first transition signal; and following a transition in state of all of the devices in the first transition group pair, communicating to all the devices in a second transition group pair of the transition group pairs a second transition signal.

13. The non-transitory computer-readable medium of claim 11, wherein the operations further comprise:
calculating transition group latencies for each of the transition groups as the highest latency of one of the devices included in the transition group;
setting a transition group pair latency as the higher of the transition group latencies of the transition groups included in each transition group pair;
calculating a minimum latency for one or more of the transition groups formed from the devices of the On-to-Off set,
wherein the executing of the micro DR event includes:
at a first time, communicating to all of the devices in a first transition group pair of the transition group pairs a first transition signal; and
at a second time, communicating to all the devices in a second transition group pair of the transition group pairs a second transition signal,
wherein the second time is equal to a transition group pair latency for the first transition group minus the minimum latency for the transition group formed from the devices of the On-to-Off set that is included in the second transition group pair.

14. The non-transitory computer-readable medium of claim 11, wherein the forming of the latency groups from the devices of the On-to-Off set and the forming of the latency groups from the devices of the Off-to-On set include:
calculating initial latency groups;
creating the latency groups from the initial latency groups; and
sorting the latency groups based on the device curtailment capacities of the devices included in the latency groups.

15. The non-transitory computer-readable medium of claim 14, wherein the calculating of the initial latency groups includes:
sorting the devices of the Off-to On set in decreasing order by latency;
beginning at the device of the Off-to On set having a highest latency, adding the devices to the initial latency groups until a sum of the device curtailment capacities of the devices in the initial latency groups exceeds the lower curtailment margin;
sorting the devices of the On-to-Off set in decreasing order by latency;
beginning at the device of the On-to-Off set having a highest latency, adding the devices to the initial latency groups until a sum of the device curtailment capacities of the devices in the initial latency groups exceeds the upper curtailment margin;
recording a cumulative sum of the device curtailment capacities for each of the initial latency groups and a smallest latency of one of the devices of each of the initial latency groups; and
generating an On-to-Off list that includes the initial latency groups calculated from the devices of the On-to-Off set and an Off-to-On list that includes the initial latency groups calculated from the devices of the Off-to-On set.

16. The non-transitory computer-readable medium of claim 15, wherein the creating of latency groups includes:
adding a first device having a highest latency of the On-to-Off list to a first latency group;
continuing to add devices to the first latency group in an order in which the devices appear in the On-to-Off list until a latency of a device to be added is less than a first latency threshold;
adding a second device having a highest latency of the Off-to-On list to a second latency group; and
continuing to add devices to the second latency group in an order in which the devices appear in the Off-to-On list until a latency of a device to be added is less than a second latency threshold.

17. The non-transitory computer-readable medium of claim 16, wherein the first and second latency thresholds are defined according to expressions:

$$L\_threshold_i = z_i - l_{avg} \times (s_i / C_m)$$

$$l_{avg} = (1/\Sigma_d c_d) \Sigma_d c_d l_d;$$

wherein:
L_threshold represents the latency threshold;
i and d are indexing variables;
z represents a smallest latency of one of the devices in an initial latency group;
$l_{avg}$ represents a curtailment-weighted average latency;
s represents a cumulative sum of curtailments for an initial latency group;
$C_m$ represents an upper curtailment margin for an On-to-Off set and represents a lower curtailment margin for an Off-to-On set;
$C_d$ represents a device curtailment capacity; and
$l_d$ represents a latency for a device.

18. The non-transitory computer-readable medium of claim 11 wherein:
sorting each of the latency groups based on the device curtailment capacities of the devices included in each of the latency groups;
the portioning the transition groups from the devices of the On-to-Off set includes:
from the sorted latency groups of the devices of the On-to-Off set, adding the devices to a transition group if a sum of the device curtailment capacities of the transition group when the device is added to the transition group does not exceed a dynamic upper curtailment capacity, and
not adding the device to the transition groups if the sum of the device curtailment capacities of the transition group when the device is added to the transition group exceeds the dynamic upper curtailment capacity; and the portioning the transition groups from the devices of the Off-to-On set includes:
from the sorted latency groups of the devices of the Off-to-On set, adding the devices to a transition group if a sum of the device curtailment capacities of the transition group when the device is added to the transition group does not exceed a dynamic lower curtailment capacity, and
not adding the device to the transition groups if the sum of the device curtailment capacities of the transition group when the device is added to the transition group exceeds the dynamic lower curtailment capacity.

19. The non-transitory computer-readable medium of claim 11, wherein:
the dynamic lower curtailment margin is defined by a dynamic lower curtailment margin expression:

$$C_{dyn\_lower} = M_1 + C_1 + C_2 \ldots + C_{i-1}; \text{ and}$$

the dynamic upper curtailment margin is defined by a dynamic upper curtailment margin expression:

$$C_{dyn\_upper} = M_2 - C_1 - C_2 \ldots - C_{i-1},$$

wherein:
- $C_{dyn\_lower}$ represents the dynamic lower curtailment margin;
- $C_{dyn\_upper}$ represents the dynamic upper curtailment margin;
- $M_2$ represents the upper curtailment margin;
- $M_1$ represents the lower curtailment margin;
- C represents a difference of the device curtailment capacities of a transition group formed from devices of the Off-to-On set and the device curtailment capacities of a corresponding transition group formed from devices of the On-to-Off set; and
- i is an indexing variable.

20. The non-transitory computer-readable medium of claim 11, wherein:
   the devices are associated with multiple customers and include one or more of an air-conditioner (A/C) unit, a water heater, a household appliance, a piece of industrial equipment, a refrigerator, a fan, a freezer, a heater, a ventilation unit, a thermostatically controlled unit, an appliance charging device, an electric vehicle charging device, a pool pump, and a pool heater, and
   the devices are enrolled in a Direct Load Control (DLC) DR program or an Energy Management System (EMS) DR program.

\* \* \* \* \*